(12) United States Patent
Logunov

(10) Patent No.: US 8,897,612 B2
(45) Date of Patent: Nov. 25, 2014

(54) LIGHT-COUPLING OPTICAL SYSTEMS AND METHODS EMPLOYING LIGHT-DIFFUSING OPTICAL FIBER

(71) Applicant: Corning Incorporated, Corning, NY (US)

(72) Inventor: Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/938,811

(22) Filed: Jul. 10, 2013

(65) Prior Publication Data

US 2013/0294106 A1   Nov. 7, 2013

Related U.S. Application Data

(63) Continuation of application No. 13/269,733, filed on Oct. 10, 2011, which is a continuation-in-part of application No. 13/094,221, filed on Apr. 26, 2011.

(51) Int. Cl.

| | |
|---|---|
| *G02B 6/30* | (2006.01) |
| *G02B 6/26* | (2006.01) |
| *G02B 6/10* | (2006.01) |
| *G02B 6/032* | (2006.01) |
| *F21V 8/00* | (2006.01) |
| *F21V 13/02* | (2006.01) |

(52) U.S. Cl.
CPC .............. *G02B 6/001* (2013.01); *G02B 6/0028* (2013.01); *F21V 13/02* (2013.01); *Y10S 385/901* (2013.01)
USPC ............... 385/49; 385/31; 385/125; 385/129; 385/901

(58) Field of Classification Search
None
See application file for complete search history.

(56) References Cited

U.S. PATENT DOCUMENTS

| | | | | |
|---|---|---|---|---|
| 4,422,719 A | * | 12/1983 | Orcutt | 385/123 |
| 4,466,697 A | * | 8/1984 | Daniel | 385/123 |
| 4,733,929 A | * | 3/1988 | Brown | 385/31 |
| 6,234,656 B1 | | 5/2001 | Hosseini et al. | |
| 6,361,180 B1 | | 3/2002 | Iimura | |
| 6,714,711 B1 | * | 3/2004 | Lieberman et al. | 385/124 |

(Continued)

FOREIGN PATENT DOCUMENTS

JP          2003195297 A   *   7/2003

OTHER PUBLICATIONS

Motokage, Kikuchi, Machine Translation of JP 2003195297A, Jul. 2003.*

*Primary Examiner* — Michelle R Connelly
(74) *Attorney, Agent, or Firm* — Svetlana Short

(57) ABSTRACT

Light-coupling systems and methods that employ light-diffusing optical fiber are disclosed. The systems include a light source and a light-diffusing optical fiber optically coupled thereto. The light-diffusing optical fiber has a core, a cladding and a length. At least a portion of the core comprises randomly arranged voids configured to provide substantially spatially continuous light emission from the core and out of the cladding along at least a portion of the length. A portion of the light-diffusing optical is embedded in an index-matching layer disposed adjacent a lower surface of a transparent sheet. Light emitted by the light-diffusing optical fiber is trapped within the transparent sheet and index-matching layer by total internal reflection and is scattered out of the upper surface of the transparent sheet by at least one scattering feature thereon.

39 Claims, 31 Drawing Sheets

(56) References Cited

U.S. PATENT DOCUMENTS

| | | |
|---|---|---|
| 7,048,401 B2 | 5/2006 | Lee |
| 7,194,158 B2 * | 3/2007 | Schultheis et al. .............. 385/31 |
| 2003/0123261 A1 | 7/2003 | Mutha et al. |
| 2005/0185395 A1 | 8/2005 | Pinter |
| 2007/0097108 A1 | 5/2007 | Brewer |
| 2007/0153162 A1 * | 7/2007 | Wright et al. ................... 349/96 |
| 2009/0027587 A1 | 1/2009 | Itoh et al. |
| 2010/0238374 A1 * | 9/2010 | Ohse ............................... 349/61 |

* cited by examiner

US 8,897,612 B2

LIGHT-COUPLING OPTICAL SYSTEMS AND METHODS EMPLOYING LIGHT-DIFFUSING OPTICAL FIBER

CROSS-REFERENCE TO RELATED APPLICATIONS

This Application is a continuation of U.S. patent application Ser. No. 13/269,733, filed on Oct. 10, 2011, and entitled "Light-coupling optical systems and methods of employing light-diffusing optical fiber," which is a continuation-in-part of U.S. patent application Ser. No. 13/094,221, filed on Apr. 26, 2011, and entitled, "Systems and methods for coupling light into a transparent sheet," both applications are incorporated by reference herein.

FIELD

The disclosure is generally directed light-coupling optical systems, and in particular to light-coupling optical systems and methods that employ light-diffusing optical fiber.

BACKGROUND

There is an increasing variety of electronic-based devices that utilize flat-screen displays. Such devices range in size from the largest flat-screen televisions to the smallest hand-held devices such as cell-phones.

In certain types of flat-screen displays, an internal light source provides the light needed to view the display. For example, in one type of liquid-crystal display, an addressable liquid-crystal display structure is backlit with an internal light source and employs crossed polarizers on either side of the structure. Other types of flat-screen displays are reflective displays (e.g., reflective liquid crystal displays) that operate without backlighting or other internal light source and instead use ambient light from an external light source, such as room light.

While reflective displays that utilize ambient light are appealing for certain applications (e.g., so-called e-book applications), these displays are not functional in a dark environment and require an internal light source. However, the internal light source should be configured to maintain the compact and planar nature of the display while also providing illumination of sufficient uniformity and intensity to make the display readable.

SUMMARY

An embodiment of the disclosure is a light-coupling optical system. The light-coupling system includes a transparent sheet having substantially parallel opposite upper and lower surfaces and a first refractive index. An index-matching layer is disposed in contact with the lower surface of the transparent sheet and has a second refractive index that is substantially the same as the first refractive index. The light-coupling system has at least one light-diffusing optical fiber with a glass core, a cladding that surrounds the glass core, and a length. The glass core has randomly arranged voids configured to provide substantially spatially continuous light emission from the glass core and out of the cladding and into the transparent sheet along at least a portion of the length. The at least one light-diffusing optical fiber is at least partially disposed within the index-matching layer. The light-coupling optical system has at least one light source optically connected to the at least one light-diffusing optical fiber and that emits light into the at least one light-diffusing optical fiber, with the light traveling therein as guided light scattering therefrom as scattered light. The at least one light-diffusing optical fiber is arranged so that the scattered light travels within the transparent sheet and the index-matching layer via total internal reflection and is scattered out of the upper surface of the transparent sheet by at least one scattering feature of the transparent sheet.

Another embodiment is a method of providing illumination from a substantially planar surface of a transparent sheet having upper and lower surfaces. The method includes disposing at least a portion of at least one light-diffusing optical fiber within an index-matching layer that is immediately adjacent the lower surface of the transparent sheet. The at least one light-diffusing optical fiber has a core, a cladding and a length. At least a portion of the glass core includes randomly arranged voids configured to provide substantially continuous light emission from the core and out of the cladding along said portion of the light-diffusing optical fiber. The method also includes sending light down the glass core of at least one light-diffusing optical fiber as guided light to cause said light emission, with the emitted light traveling within the transparent sheet and the index-matching layer by total internal reflection. The method also includes scattering at least a portion of the light traveling within the transparent sheet and the index-matching layer out of the upper surface of the transparent sheet.

Another embodiment is a light-coupling optical system that has a transparent sheet with substantially parallel opposite upper and lower surfaces and a first refractive index. An index-matching layer is disposed in contact with the lower surface of the transparent sheet and has a second refractive index substantially the same as the first refractive index. A light source that emits light is optically coupled to a light diffusing optical fiber hat is at least partially disposed within the index-matching layer. The light-diffusing optical fiber carries the light as guided light. The light-diffusing optical fiber has randomly arranged voids configured to provide substantially spatially continuous light emission due to scattering of the guided light from an outer surface of the light-diffusing optical fiber. The light-diffusing optical fiber is arranged so that the scattered light travels within the transparent sheet and the index-matching layer via total internal reflection and is scattered out of the upper surface of the transparent sheet by at least one scattering feature of the transparent sheet.

Another embodiment is a light-coupling optical system having a transparent sheet with upper and lower surfaces and a first refractive index. An index-matching layer is disposed in contact with the lower surface of the transparent sheet and has a second refractive index substantially the same as the first refractive index. The light-coupling optical system includes a light source that emits light. A light-diffusing optical fiber that is at least partially disposed within the index-matching layer and that is optically coupled to the light source to carry the light as guided light. The light-diffusing optical fiber has randomly arranged voids configured to provide substantially spatially continuous light emission due to scattering of the guided light from an outer surface of the light-diffusing optical fiber. The light-diffusing optical fiber is arranged so that the scattered light travels within the transparent sheet and the index-matching layer via total internal reflection and is scattered out of the upper surface of the transparent sheet by at least one scattering feature of the transparent sheet.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The claims are incorporated into and constitute part of this specification. The drawings illustrate various embodiments and together with the description serve to explain the principles and operation.

Figure 12A:
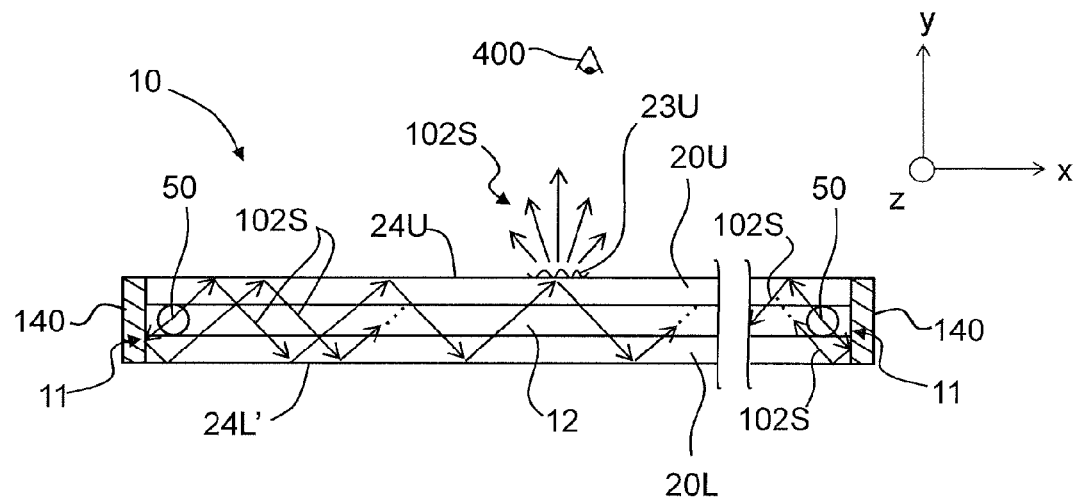
FIG. 12A is a cross-sectional view of embodiments of the optical assembly of the light-coupling optical system of FIG.
Figure 12B:
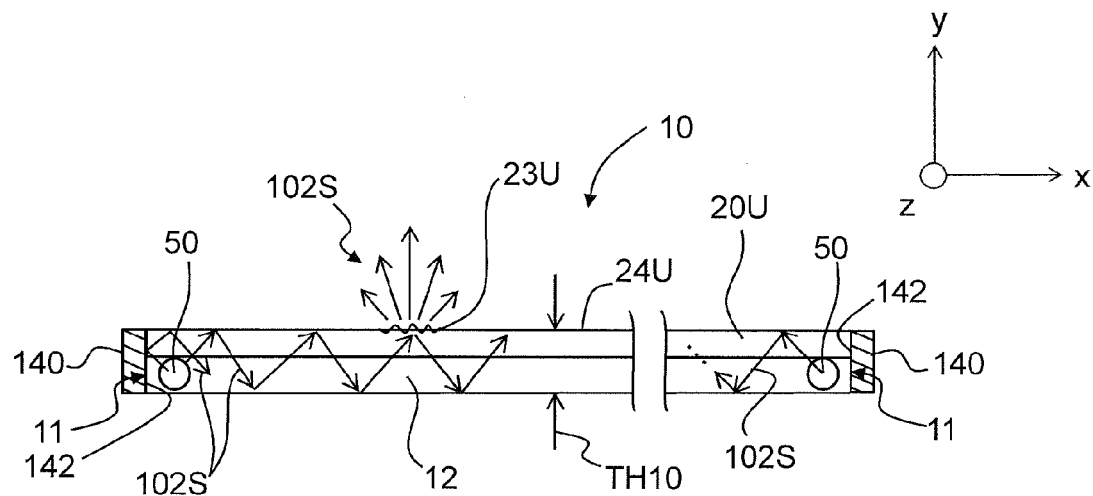
Figure 12C:
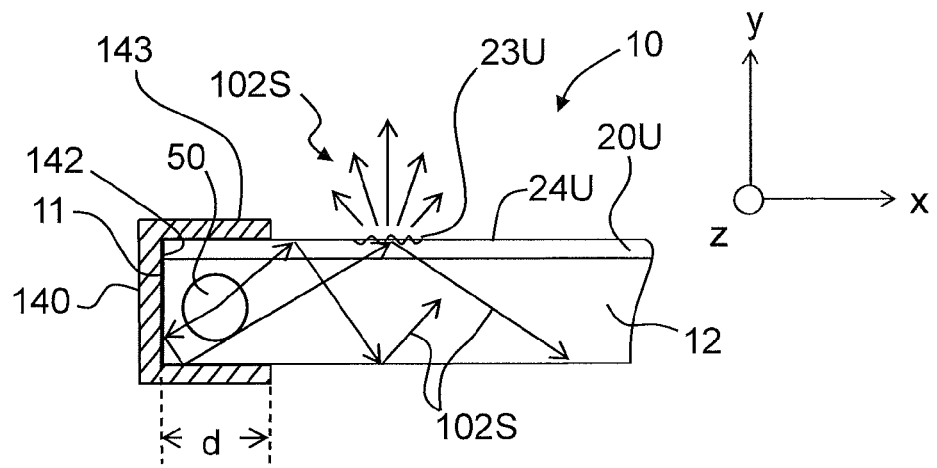
Figure 12D:
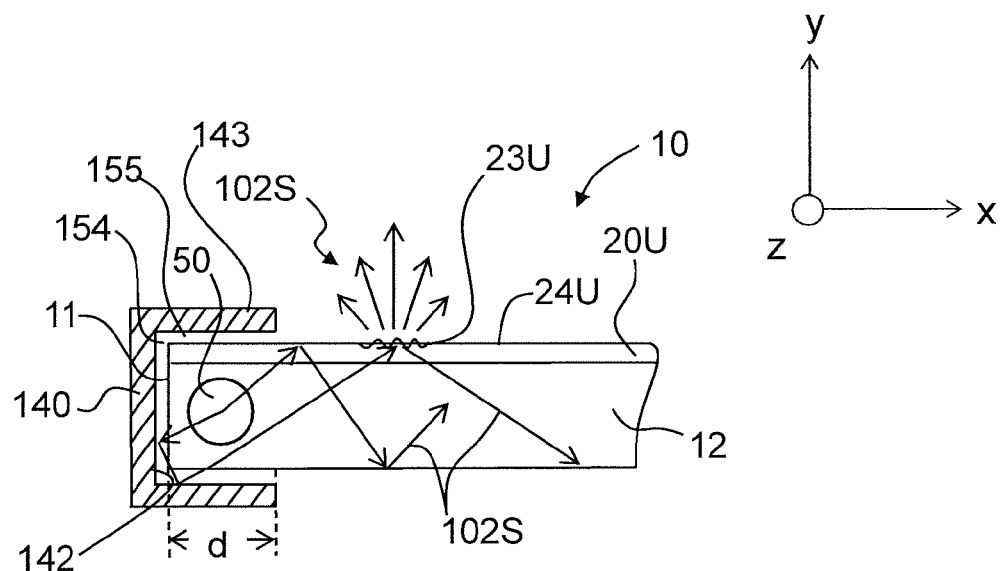
Figure 12E:
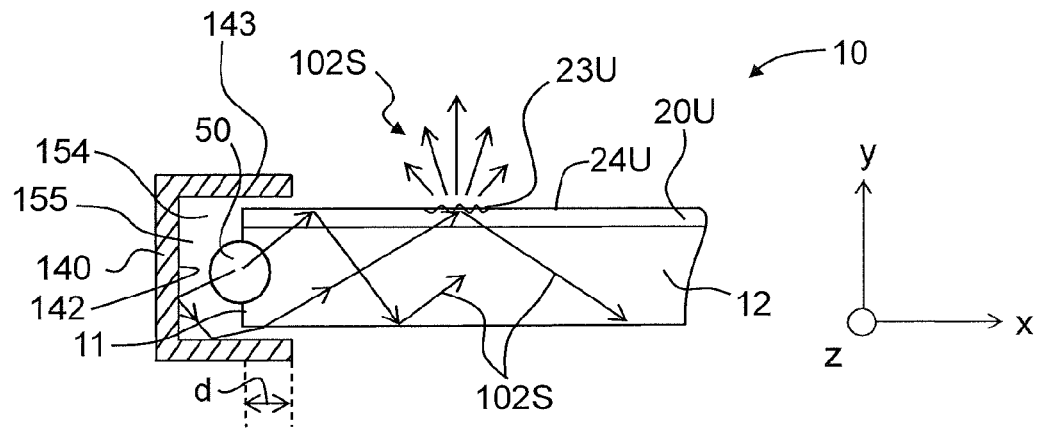
Figure 12F:
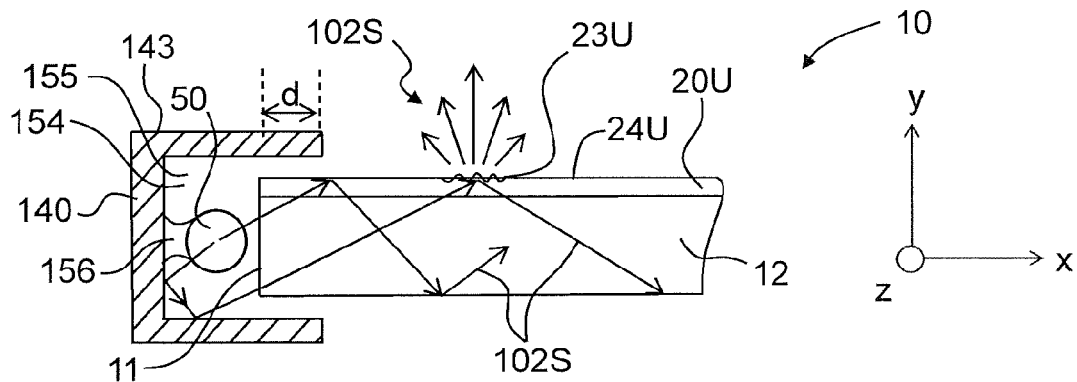
Figure 12G:
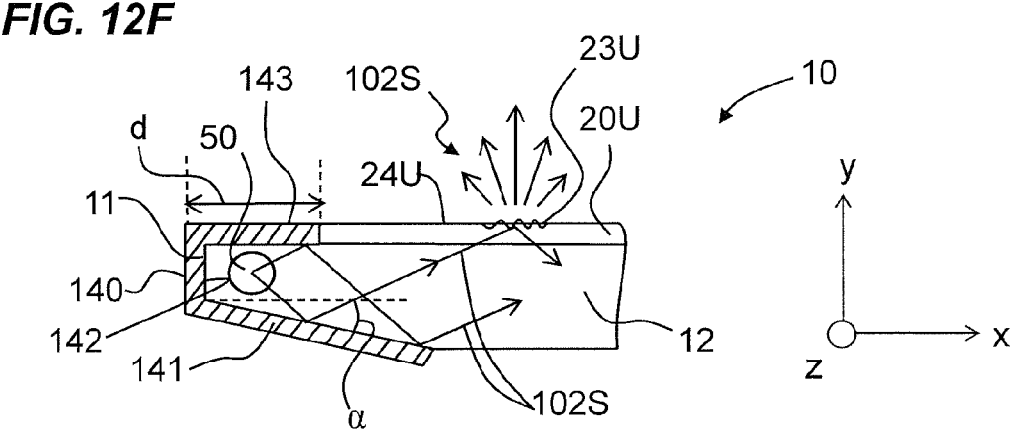
Figure 13:
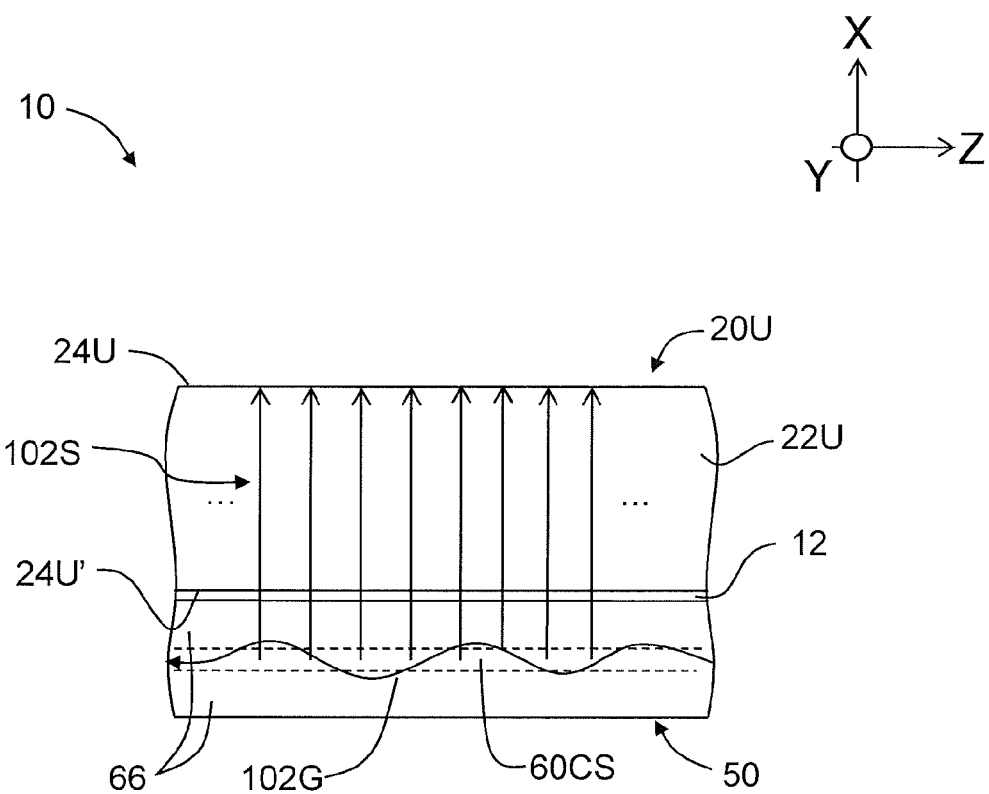
Figure 14:
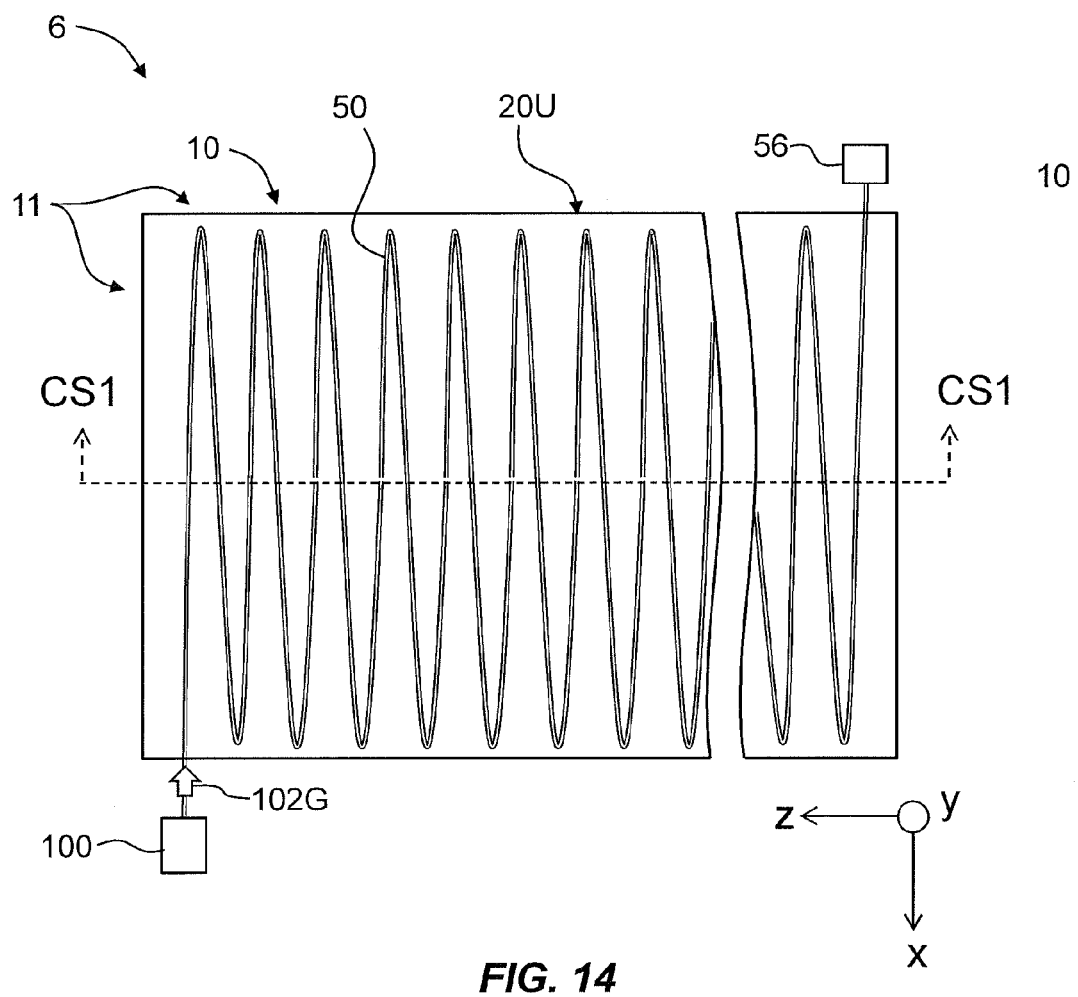
Figure 15A:
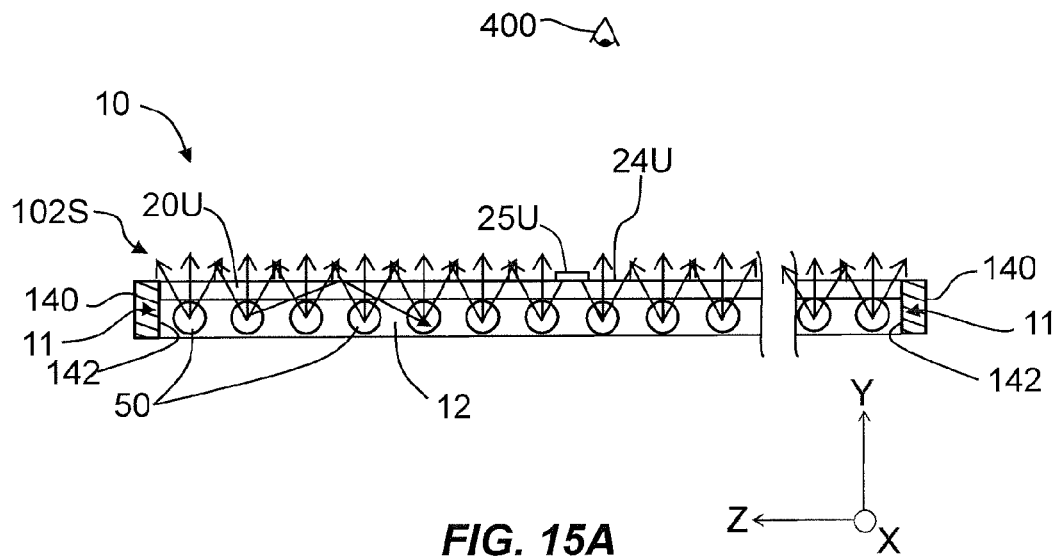
Figure 15B:
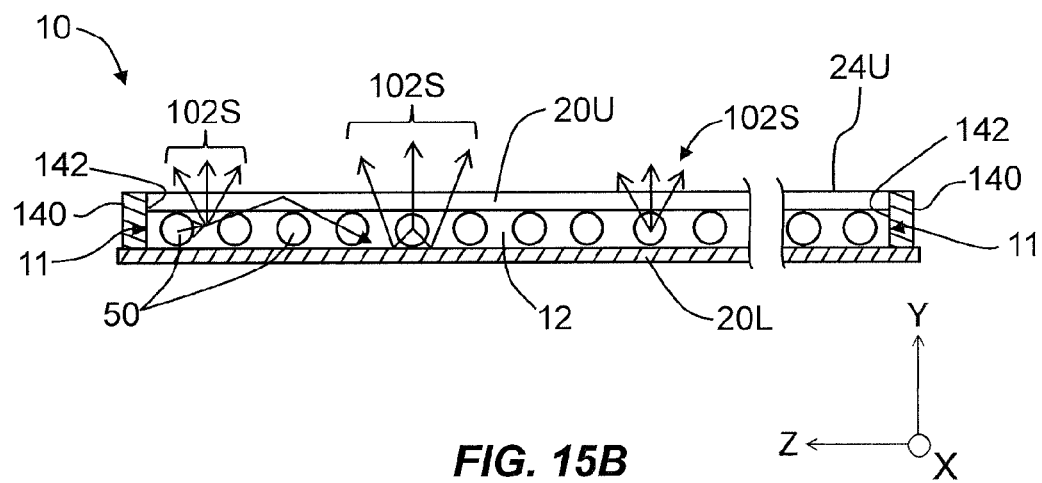
Figure 16A:
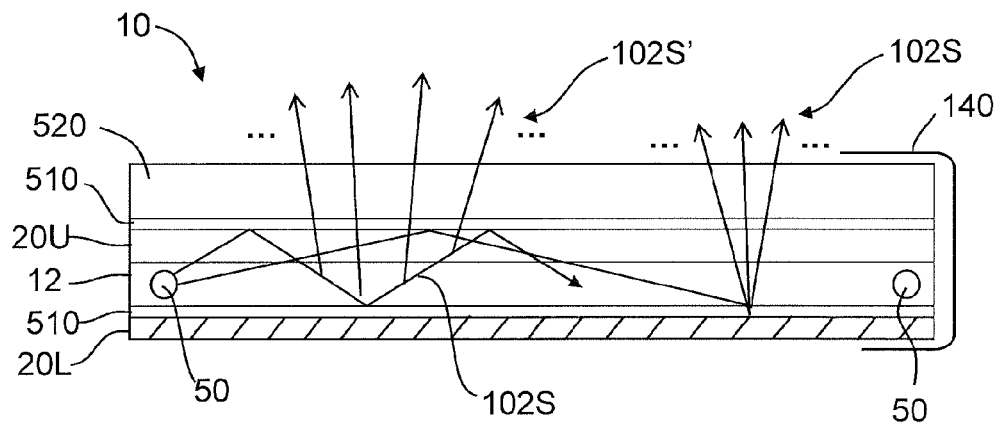
Figure 16B:
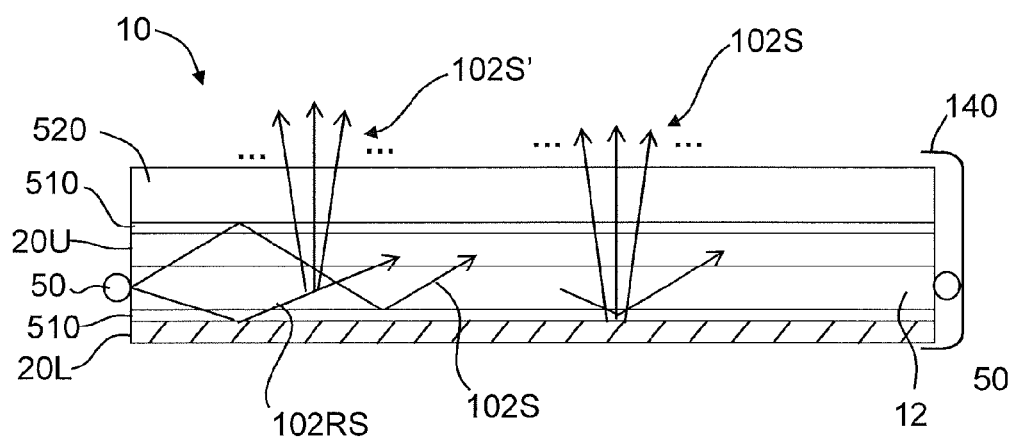
Figure 17:
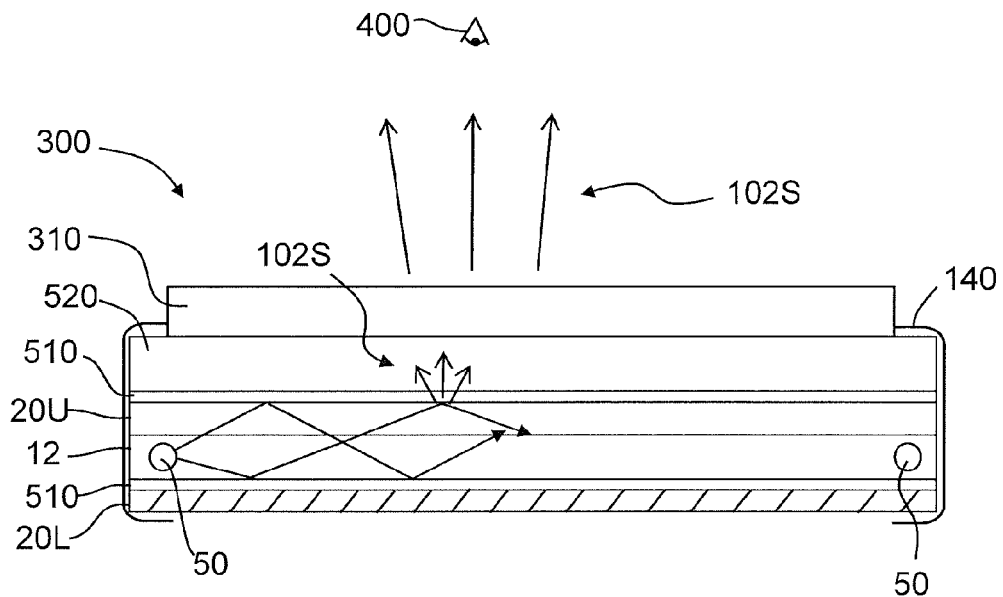
Figure 18A:
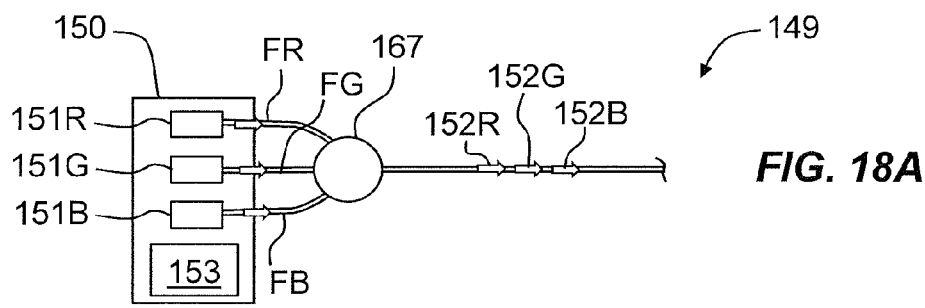
Figure 18B:
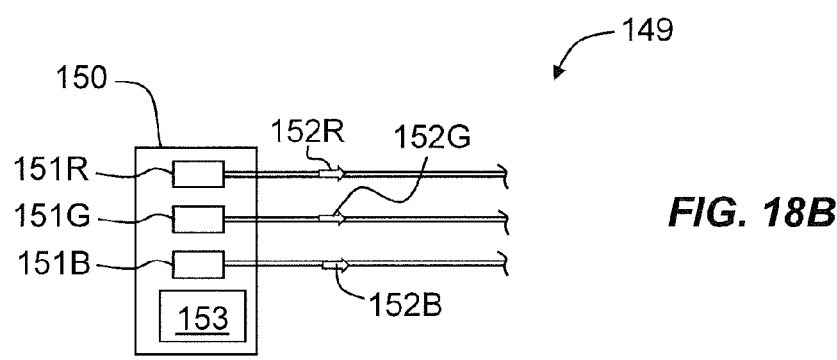

9A as taken in the X-Y plane, with the optical assembly having upper and lower transparent sheets sandwiching an index-matching layer;

FIG. 12B is similar to FIG. 12A and illustrates an example embodiment where the optical assembly includes upper sheet and an index-matching layer and no lower sheet;

FIG. 12C is a close-up cross-sectional view of an end portion of the optical assembly illustrating an example embodiment where the reflecting member has a U-shape and is arranged in contact with the perimeter, the upper sheet and the index-matching layer;

FIG. 12D is similar to FIG. 12C and illustrates an example embodiment where the reflecting member is spaced apart from the perimeter, the upper sheet and the index matching layer by an air gap;

FIG. 12E is similar to FIG. 12D, except that a portion of the light-diffusing optical fiber extends from the perimeter;

FIG. 12F is similar to FIG. 12E, except that the light-diffusing optical fiber resides outside of the index matching layer and adjacent the perimeter;

FIG. 12G is similar to FIG. 12C and illustrates an example embodiment wherein the reflecting member has an angled portion;

FIG. 13 is close-up cross-sectional view of an optical assembly, showing how guided light traveling in the light-diffusing optical fiber is emitted from the sides of the light-diffusing optical fiber and travels through the upper transparent sheet;

FIG. 14 is a top-down view of an example embodiment of the light-coupling optical system wherein the light-diffusing optical fiber has a serpentine configuration in the X-Z plane;

FIG. 15A is a cross-sectional view of the example embodiment of light-coupling optical system of FIG. 14 as taken along the line CS1 therein and showing the scattered light from the light-diffusing optical fiber passing through the upper transparent sheet;

FIG. 15B is similar to FIG. 15A and illustrates an example embodiment wherein the light-coupling optical system includes a reflective lower sheet as well as side reflectors;

FIG. 16A is a cross-sectional view similar to that of FIG. 12B and illustrates another example embodiment of an optical assembly that includes additionally includes low-index layers that sandwich the upper sheet and the index-matching layer, and wherein the lower sheet comprises a diffuse reflector;

FIG. 16B is similar to FIG. 16A and illustrates an example where the light-diffusing optical fibers reside outside of and adjacent the index-matching layer;

FIG. 17 is a cross-sectional view of an example embodiment of a display screen device that includes the optical assembly of FIG. 16A;

FIG. 18A is a close-up view of an example light source assembly wherein the light source includes red, green and blue light emitters that are optically coupled to the light-diffusing optical fiber via a multiplexing device; and FIG. 18B is similar to FIG. 18A, except that the three different light-diffusing optical fibers are optically coupled directly to the respective red, green and blue light emitters.

DETAILED DESCRIPTION

Reference is now made in detail to the preferred embodiments of the disclosure, examples of which are illustrated in the accompanying drawings. Whenever possible, like reference numbers are used to refer to like components or parts. Cartesian coordinates are shown in some of the Figures by way of reference.

Figure 1:
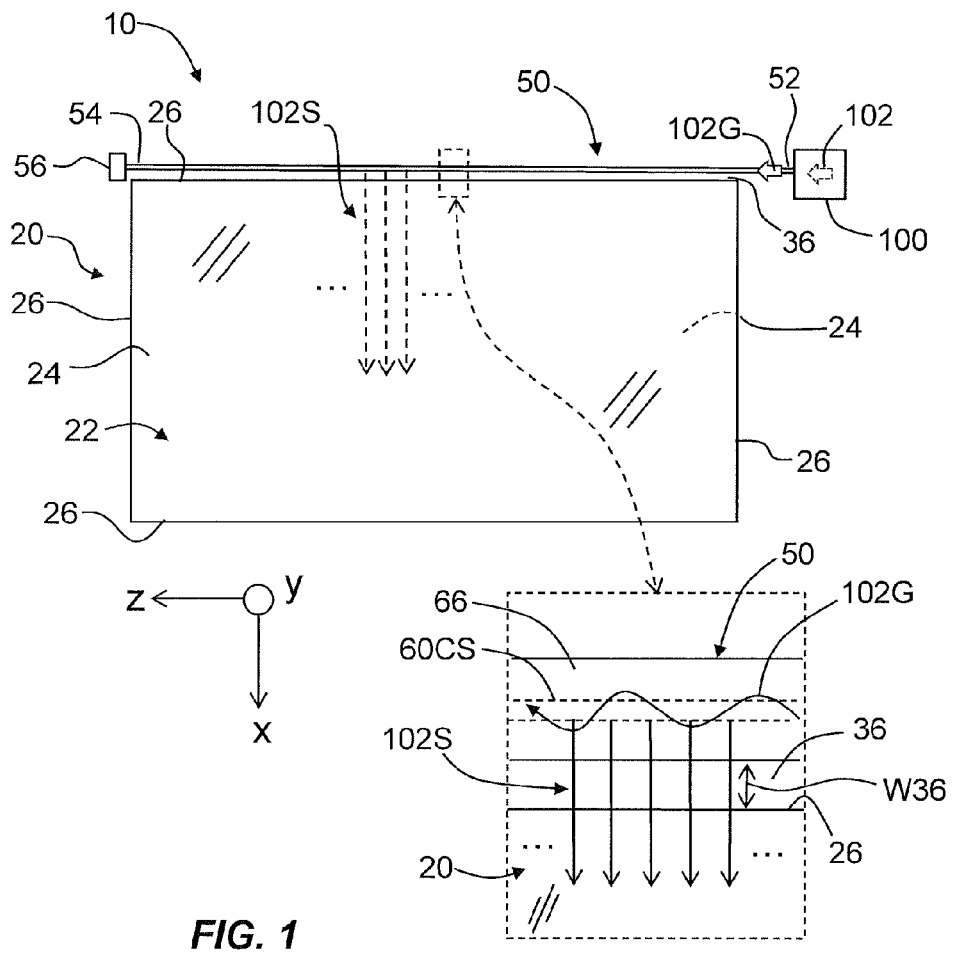
FIG. 1 is a top-down view of an example light-coupling optical system according to the disclosure.
Figure 2:
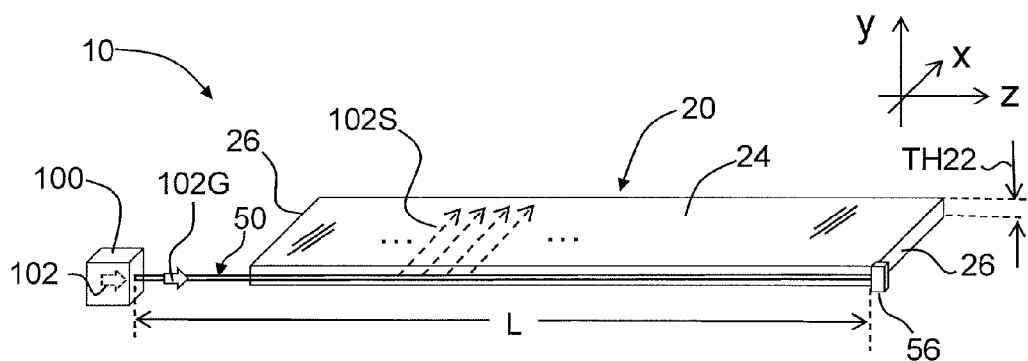
FIG. 2 is an elevated view of the light-coupling optical system of FIG. 1.

FIG. 1 is a top-down view of an example light-coupling optical system 6 according to the disclosure. FIG. 2 is an elevated view of the light-coupling optical system 6 of FIG. 1. System 6 generally includes a transparent sheet 20, a light-diffusing optical fiber 50 operably disposed adjacent the transparent sheet, and a light source 100 optically coupled to the light-diffusing optical fiber. In an example, light source 100 comprises at least one light-emitting diode (LED) or at least one diode laser. Light source 100 emits light 102 that in one example is in the wavelength range from 350 nm to 1,000 nm, while in another example is in the visible wavelength range, e.g., nominally from 380 nm (violet) nm to 750 nm (red).

Transparent sheet 20 has a body 22 that defines a thickness TH22, opposite upper and lower (i.e., top and bottom) substantially planar and substantially parallel surfaces 24, and one or more edges 26, such as four edges 26 for a rectangular transparent sheet. Transparent sheet 20 can be made of, for example, glass, plastic, display glass such as Corning's EAGLE XG®, EAGLE®, GORILLA® and PYREX® glasses, as well as fused silica, plastic materials like PPMA or any other transparent material. Here, the term "transparent" generally means that the transparent sheet transmits light 102 at least in the visible wavelength range, and transmits more light than it absorbs for the given thickness TH22 of transparent sheet body 22.

In an example, the thickness TH22 of transparent sheet body 22 is 0.3 mm or greater, and in another example is 0.7 mm or greater. In an example, transparent sheet body 22 has a refractive index of about 1.5 or greater at 550 nm. Also in an example, one or more of upper and lower surfaces 24 may be rough surfaces with a roughness designed to scatter light 102.

System 6 includes at least one light-diffusing optical fiber 50. The term "light-diffusing" means that light scattering is substantially spatially continuous along at least a portion of the length of the light-diffusing optical fiber 50, i.e., there are no substantial jumps or discontinuities such as those associated with discrete (e.g., point) scattering. Thus, the concept of substantially continuous light emission or substantially continuous light scattering as set forth in the present disclosure refers to spatial continuity.

In an example, light-diffusing optical fiber 50 includes a coupling end 52 and a terminal end 54. Coupling end 52 and terminal end 54 define a length L for light-diffusing optical fiber 50. Coupling end 52 is optically coupled to light source 100 so that light 102 from the light source travels in light-diffusing optical fiber 50 as guided light 102G. Light-diffusing optical fiber 50 is disposed adjacent at least one of transparent sheet edge 26 and transparent sheet surface 24. In an example, a terminal optical member 56 is operably disposed adjacent terminal end 54 of light-diffusing optical fiber 50. In one example, terminal optical member 56 is an optical absorber that absorbs light 102, while in another example it is an optical reflector that reflects light 102 (e.g., guided light 102G) so that the reflected guided light travels down the optical fiber 50 in the opposite direction, i.e., toward light source 100. In such an example, an optical isolator (not shown) may be employed (e.g., adjacent light source 100) to prevent light 102 from returning to light source 100.

Figure 3A:
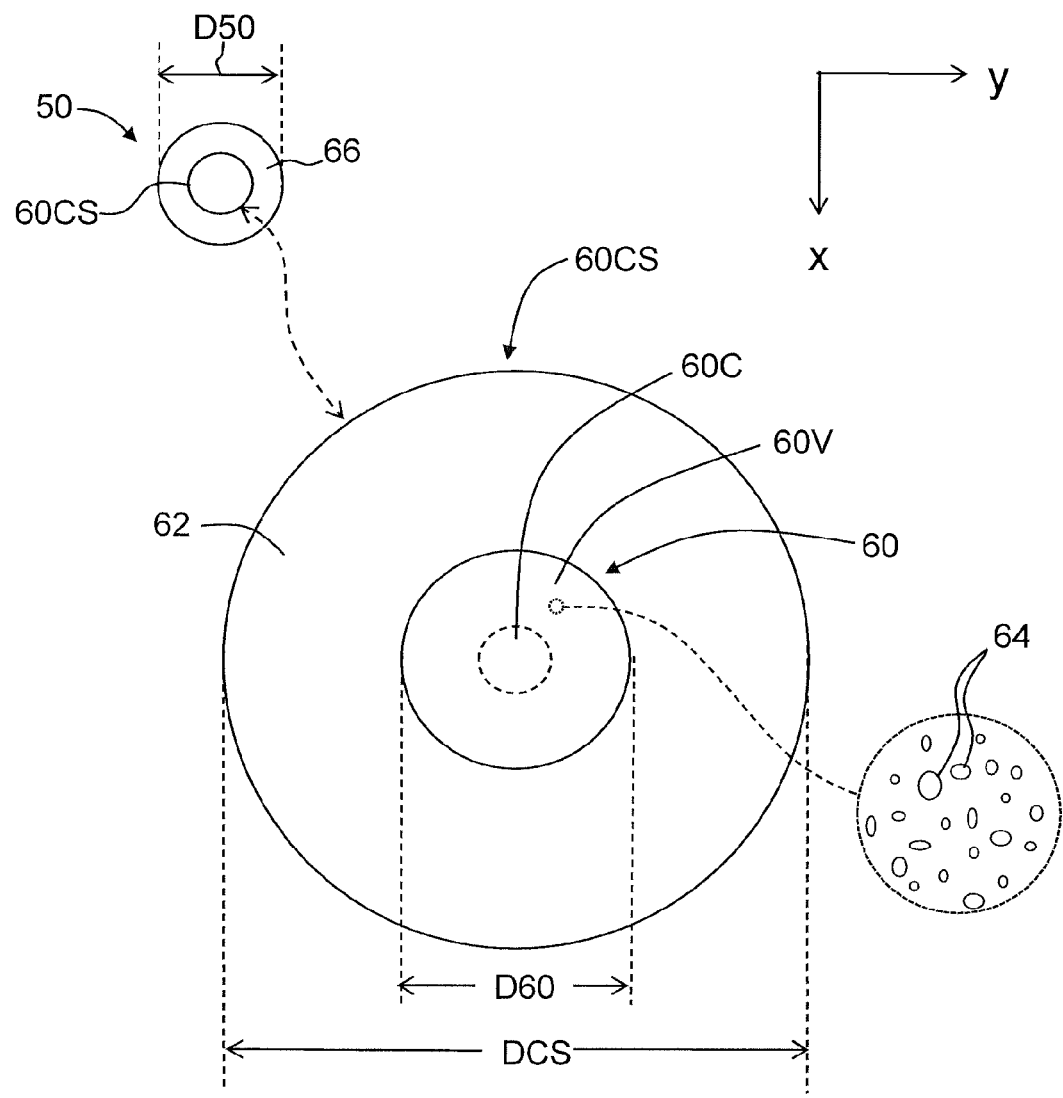
FIG. 3A is a cross-sectional view of an example light-diffusing optical fiber, including a detailed cross-sectional view of the central core section.

FIG. 3A is a cross-sectional view of an example light-diffusing optical fiber 50 having a central core section ("core") 60CS, and an outer cladding 66, and showing in detail an example configuration for the core. Light-diffusing optical fiber 50 includes a center (or inner) core region 60 having a diameter D60, and an outer core region 62 that at least partially surrounds the center core region. The center core region 60 includes a central clear (solid) region 60C surrounded by an annular void region 60V that includes randomly arranged and randomly sized voids 64, as illustrated in the lower inset of FIG. 3A. Light-diffusing optical fiber 50 also includes a cladding region 66 that surrounds core 60CS. In an example, cladding region 66 is made of low-index polymer while core 60CS comprises silica.

Examples of light-diffusing optical fibers having randomly arranged and randomly sized voids 64 (also referred to as "random air lines" or "nanostructures" or "nano-sized structures") is described in U.S. Pat. No. 7,450,806, and in U.S. patent application Ser. No. 12/950,045, which patent and patent application are incorporated by reference herein.

In an example, central clear region 60C has a nominal refractive index of about 1.46 at a wavelength of 550 nm. Also in an example, core diameter DCS is in the range from about 125 microns to 300 microns. Further in an example, the diameter D50 of light-diffusing optical fiber 50 is in the range from 0.2 mm (200 microns) to 0.25 mm (250 microns).

Figure 3B:
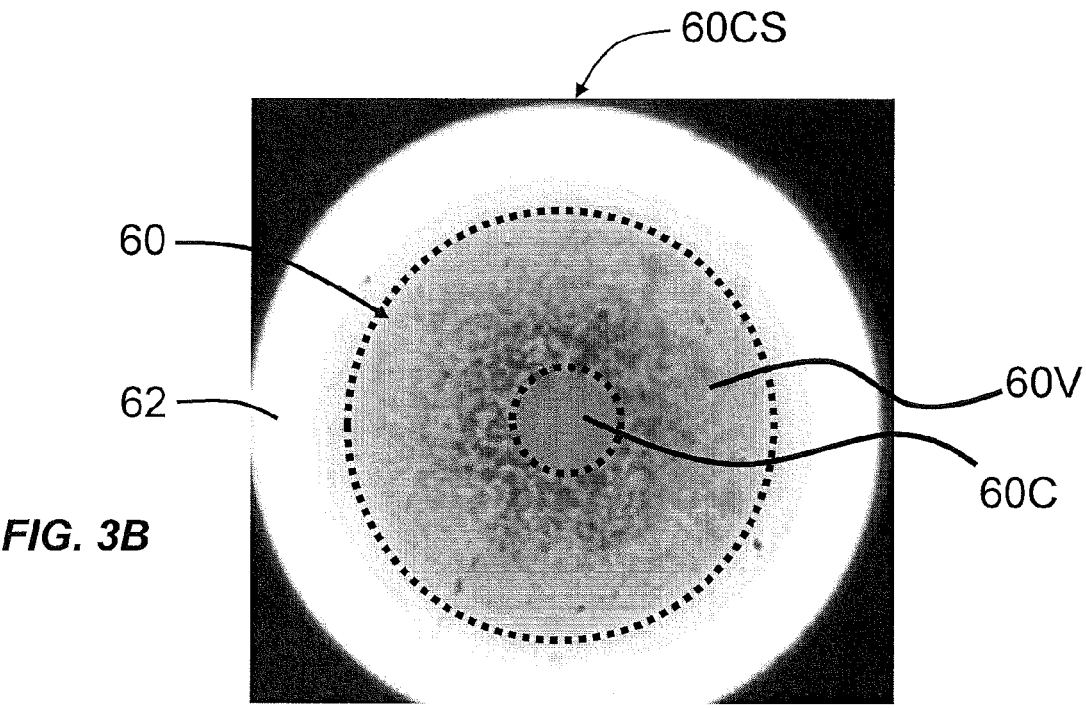
FIG. 3B and FIG. 3C are cross-sectional photographs of example light-diffusing optical fibers having different core and cladding geometries.
Figure 3C:
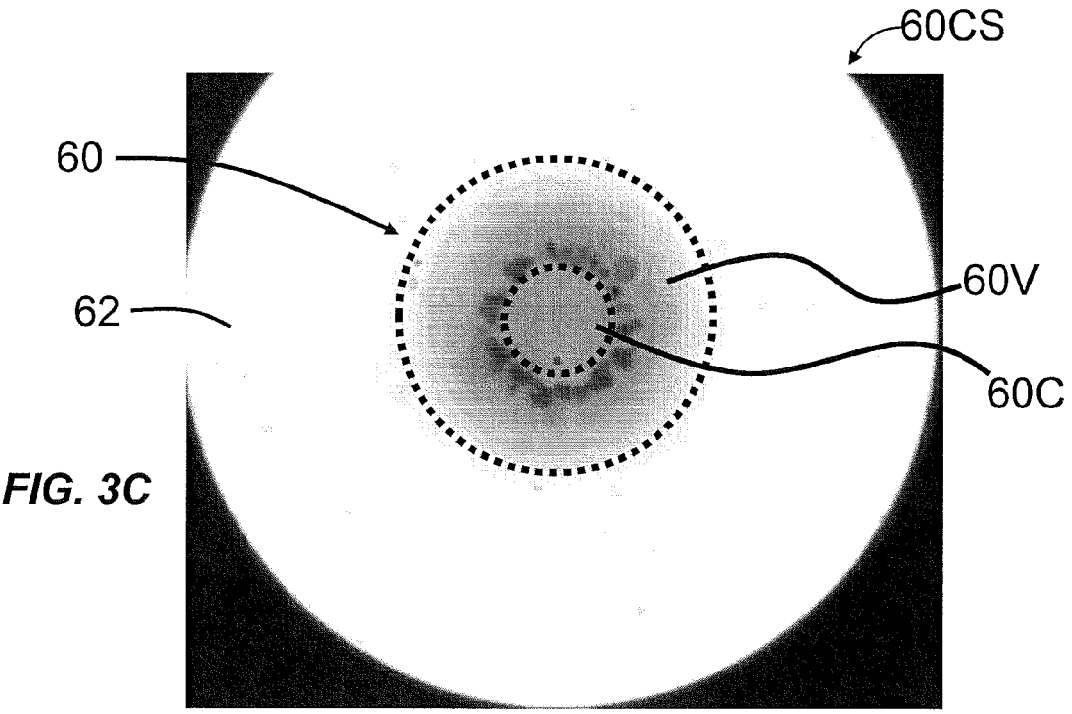

FIG. 3B and FIG. 3C are cross-sectional photographs of actual optical fiber cores 60CS illustrating two different configurations for the optical fiber center core region 60 and outer core region 62. Dotted circles have been added to the photographs to highlight the distinctions between the different regions. Optical fiber core 60CS of FIG. 3B has a relatively large annular void region 60V with relatively small voids 64 and has a loss of about 1.2 dB/m. Optical fiber core 60CS of FIG. 3C has a relatively small annular void region 60V that includes relatively large voids 64 and has a loss of about 0.4 dB/m. For both of the cores 60CS shown in FIG. 3B and FIG. 3C, central and outer core regions 60 and 62 are silica and cladding 66 is a low-refractive-index polymer. This provides light-diffusing optical fiber 50 with a relatively high NA suitable for optical coupling to light sources such as LED and laser diodes.

Light-diffusing optical fiber 50 can have a loss due to scattering that varies from 0.2 to 60 dB/m, depending on the particular configuration of center core region 60 and outer core region 62. However, as described in greater detail below, embodiments of the disclosure involve modifying light-diffusing optical fiber 50 to obtain a greater loss, e.g., up to about 300 dB/m. Thus, in an example, light-diffusing optical fiber 50 can have a loss in the range from about 0.2 dB/m to about 300 dB/m, wherein the loss is substantially spectrally uniform in the wavelength range from 250 nm to 2,000 nm and in another example is substantially spectrally uniform over the visible wavelength or "white light" spectral range (e.g., nominally from 380 nm to 750 nm).

Figure 3D:
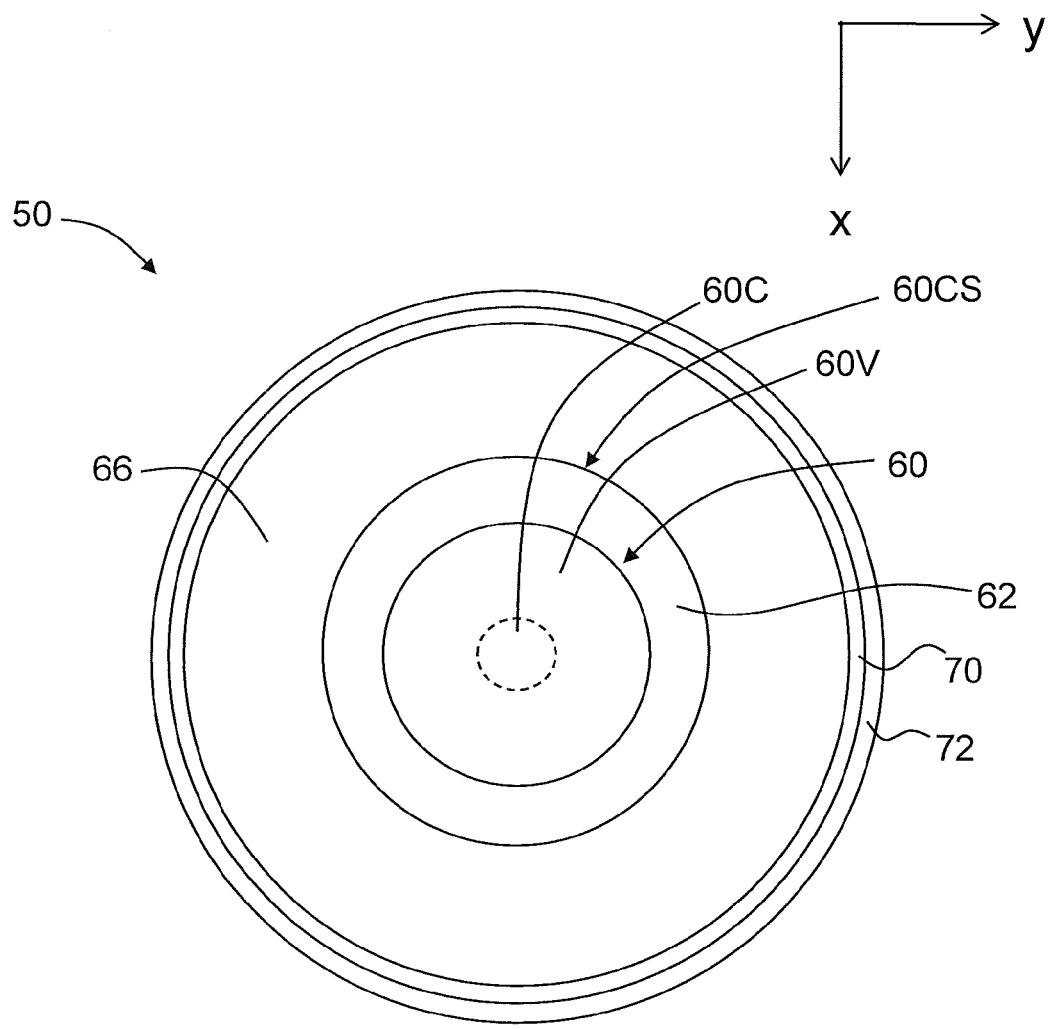
FIG. 3D is similar to FIG. 3A and illustrates another example embodiment of a light-diffusing optical fiber that includes an outer layer of light-scattering material.

FIG. 3D is similar to FIG. 3A and illustrates an example embodiment of a light-diffusing optical fiber 50. Light-diffusing optical fiber 50 of FIG. 3D includes central core region 60 having clear and void sections 60C and 60V, and outer core region 62. Cladding 66 surrounds outer core region 62. Core 60CS comprises silica, while cladding 66 is comprised of low-refractive-index polymer.

Light-diffusing optical fiber 50 further includes coating layer 70, such as acrylate polymer material, that surrounds cladding 66. Light-diffusing optical fiber 50 also includes a light-scattering layer 72 that surrounds coating layer 70. Light-scattering layer 72 comprises a light-scattering material, such as any solid particle, liquid droplet or gas bubble, or combination thereof, sized to scatter light. Specific examples of light-scattering materials include phosphorous, $TiO_2$ particles, and doped polymers, such as white acrylate inks for efficient scattering in angular space (i.e., uniform angular scattering).

Figure 5A:
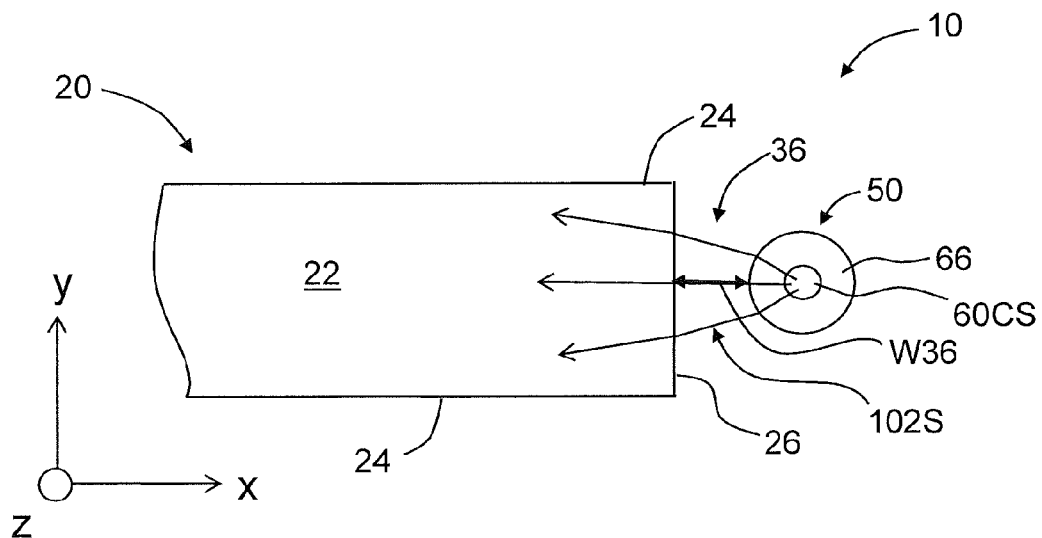
FIG. 5A is a close-up, cross-sectional view (X-Y plane) of an edge portion of the transparent sheet and the light-diffusing optical fiber operably arranged adjacent the edge of the transparent sheet.

With reference again to FIG. 1 and FIG. 2 and also to the cross-sectional view of FIG. 5A, in an example, light-diffusing optical fiber 50 is operably disposed adjacent edge 26 of transparent sheet 20, and can be in contact with the edge or can be spaced apart therefrom to define a gap 36. In an example, gap 36 can have a width W36 in the range from 0 mm (i.e., light-diffusing optical fiber 50 in contact with edge 26) up to 5 mm.

In the general operation of system 10 of FIG. 1 and FIG. 2, light source 100 generates light 102, which is coupled into light-diffusing optical fiber 50 at coupling end 52, thereby forming guided light 102G that travels down the light-diffusing optical fiber toward its terminal end 54. However, as guided light 102G travels down light-diffusing optical fiber 50, the light-diffusing property of the optical fiber generates diffused or scattered light 102S that leaves core 60 and (in one embodiment) exits cladding 66, thereby providing substantially continuous light emission of scattered light 102S along at least a portion of the optical fiber length. In an example, the aforementioned portion of the length of the light-diffusing optical fiber 50 is defined by the length of the corresponding edge 26 of transparent sheet 20.

Figure 4A:
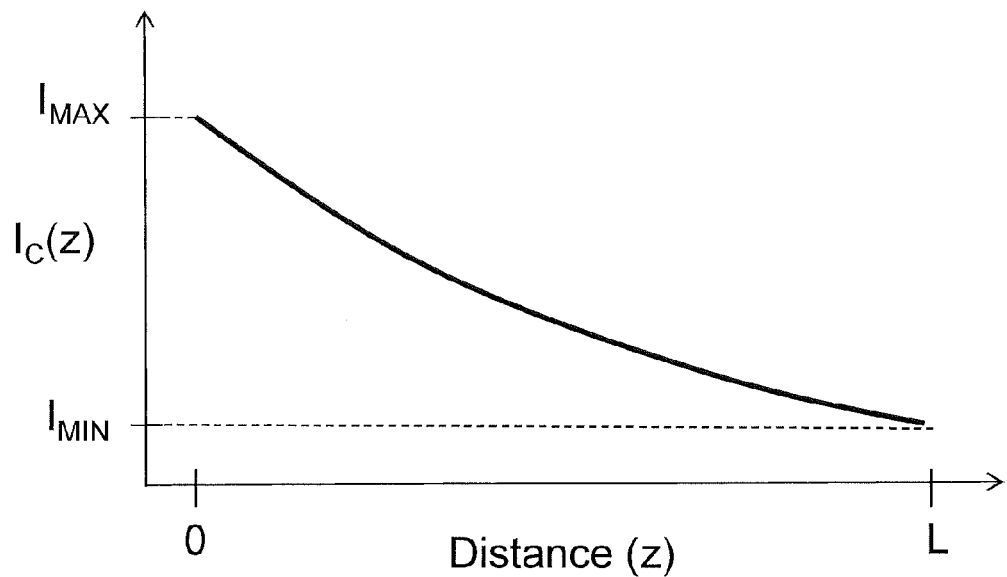
FIG. 4A is a schematic plot of the light intensity $I_C(z)$ in the core section as a function of the distance z along the length of an example light-diffusing optical fiber from the coupling end to the terminal end, illustrating the drop in light intensity within the core section due to scattering loss.

FIG. 4A is a schematic plot of the intensity $I_C(z)$ of guided light 102G traveling in core 60 versus the distance z along light-diffusing optical fiber 50. The intensity $I_C(z)$ monotonically decreases from a maximum value $I_{MAX}$ at the coupling end 52 of light-diffusing optical fiber 50 to a minimum value $I_{MIN}$ at terminal end 54. The intensity $I_S(z)$ of the scattered light 102S from core 60 has a similar shape when the light scattering is uniform over the length of the light-scattering optical fiber 50. The shape of the plot of FIG. 4A is determined by the loss characteristics of the particular light-diffusing optical fiber 50.

Figure 4B:
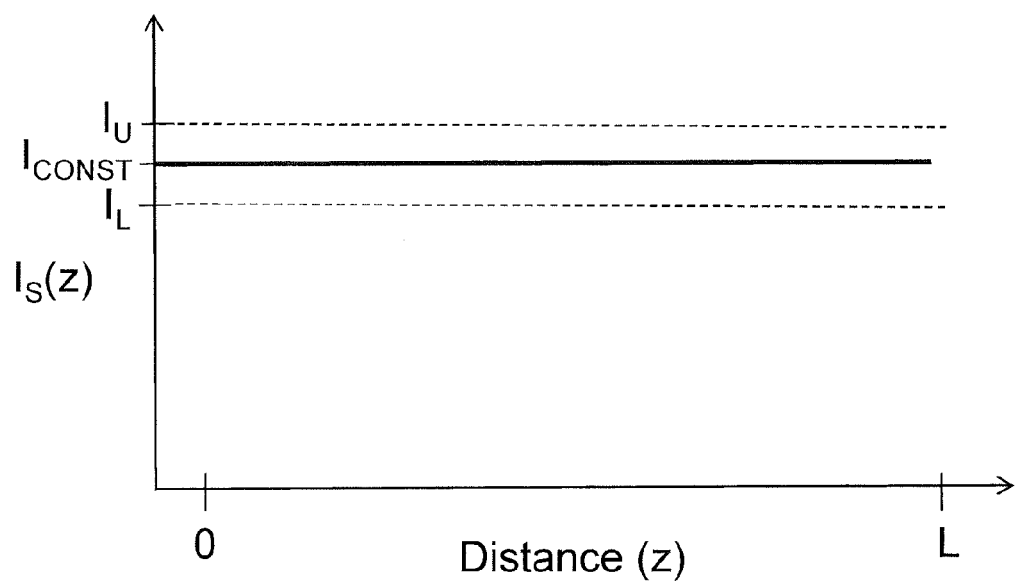
FIG. 4B is a schematic plot of the idealized scattered light intensity $I_S(z)$ from the light-diffusing optical fiber, illustrating a desired constant intensity $I_{CONST}$ of the scattered light as a function of distance z.

FIG. 4B is a schematic plot of the idealized intensity $I_S(z)$ of the scattered light 102S illustrating a desired constant intensity $I_{CONST}$ of scattered light as a function of distance z, i.e., along the length of light-diffusing optical fiber 50. In an example, $I_{CONST}$ can vary with a tolerance range, i.e., a narrow range of intensities having an upper bound $I_U$ and a lower bound $I_L$. The plot of FIG. 4B can also be the amount of scattered light 102S coupled into transparent sheet 20, so that even with a non-uniform scattered light intensity profile from light-diffusing optical fiber 50, techniques can be used to condition the scattered light before it enters transparent sheet 20. Example methods for at least partially compensating for the reduction in the intensity $I_S$ of the scattered light and the intensity $I_C$ of guided light 102G with distance along light-diffusing optical fiber 50 are described below.

In an example, the light scattering is isotropic so that a portion of scattered light 102S is directed towards transparent sheet edge 26 and is coupled into transparent sheet body 22 at the sheet edge, while the remaining portion misses the transparent sheet edge and thus is not coupled into the transparent sheet body. In the Figures, only the portion of scattered light 102S that is coupled into transparent sheet body 22 is shown for ease of illustration. The portion of scattered light 102S that is coupled into transparent sheet body 22 can serve as illumination light for a variety of applications, including flat-screen displays, such as described in greater detail below.

Figure 5B:
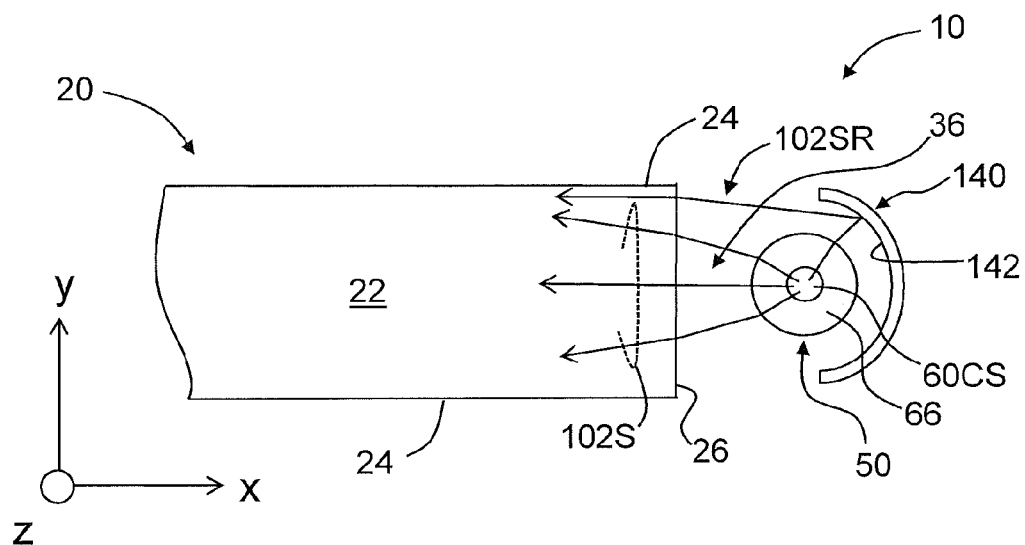
FIG. 5B is similar to FIG. 5A and further includes a reflecting member operably arranged relative to the light-diffusing optical fiber so that at least a portion of the scattered light that would not otherwise be coupled into the transparent sheet at the edge is coupled into the transparent sheet.

FIG. 5B is similar to FIG. 5A, and further includes a reflecting member 140 having a reflecting surface 142. Reflecting member 140 is disposed adjacent light-diffusing optical fiber 50 opposite transparent sheet 20. Reflecting member 140 is configured (e.g., via the shape of reflecting surface 142) to receive scattered light 102S that would otherwise miss transparent sheet 20, and direct (reflect) at least a portion of this scattered light toward edge 26 of the transparent sheet as scattered and reflected light 102SR. Thus, reflecting member 140 serves to increase the amount of scattered light reflected) light 102SR that would otherwise be lost due to the isotropic nature of the scattering process within light-diffusing optical fiber 50.

Figure 5C:
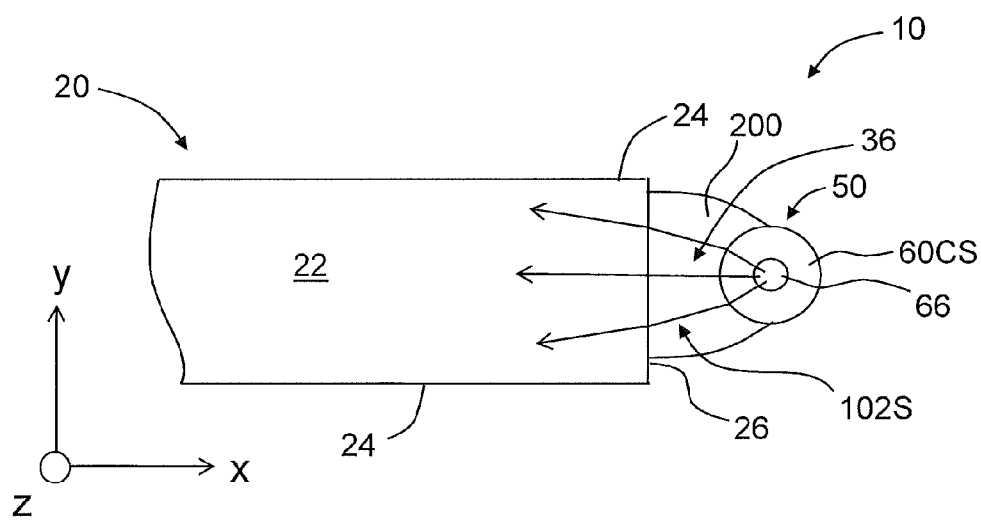
FIG. 5C is similar to FIG. 5A, and further includes an index-matching material disposed between the light-diffusing optical fiber and the transparent sheet so that the scattered light travels through the index-matching material.

FIG. 5C is similar to FIG. 5A, and further includes an index-matching material 200 disposed between light-diffusing optical fiber 50 and transparent sheet 20 so that scattered light 102S travels through the index-matching material (i.e., the index-matching material is disposed in the optical path). Index-matching material 200 has, in an example, a refractive index $n_{200}$ between that of core 60 ($n_{60}$) of light-diffusing optical fiber 50 and that of transparent sheet 20 ($n_{20}$), e.g., $(0.99)n_{60} < n_{200} < n_{20}$.

In an example, index-matching material 200 also serves to support light-diffusing optical fiber 50 relative to transparent sheet 20. In an example, index-matching material 200 has an adhesive property. An example value for $n_{60}$ is 1.46 at a wavelength 550 nm, and an example value for $n_{200}$ is in the range from 1.45 to 1.55 at a wavelength of 550 nm. Example index-matching materials include polymer-based glues, photo-curable polymers, and epoxy glues.

Figure 5D:
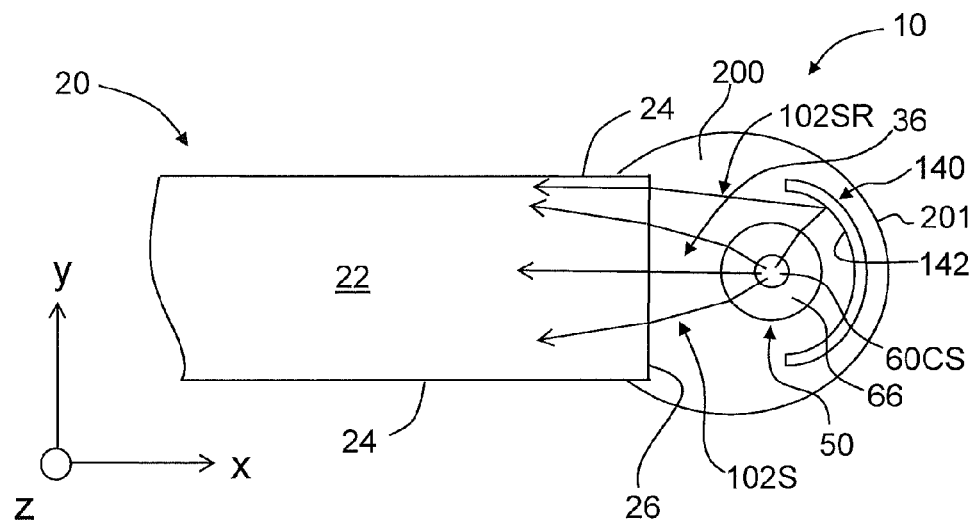
FIG. 5D is similar to FIG. 5B and illustrates an example embodiment where the index-matching material is used to support the light-diffusing optical fiber and the reflecting member.

FIG. 5D is similar to FIG. 5B and illustrates an example embodiment where index-matching material 200 is used to support light-diffusing optical fiber 50 and reflecting member 140. In an example, reflecting member 140 may be supported on an outside surface 201 of index-matching material 200.

Figure 5E:
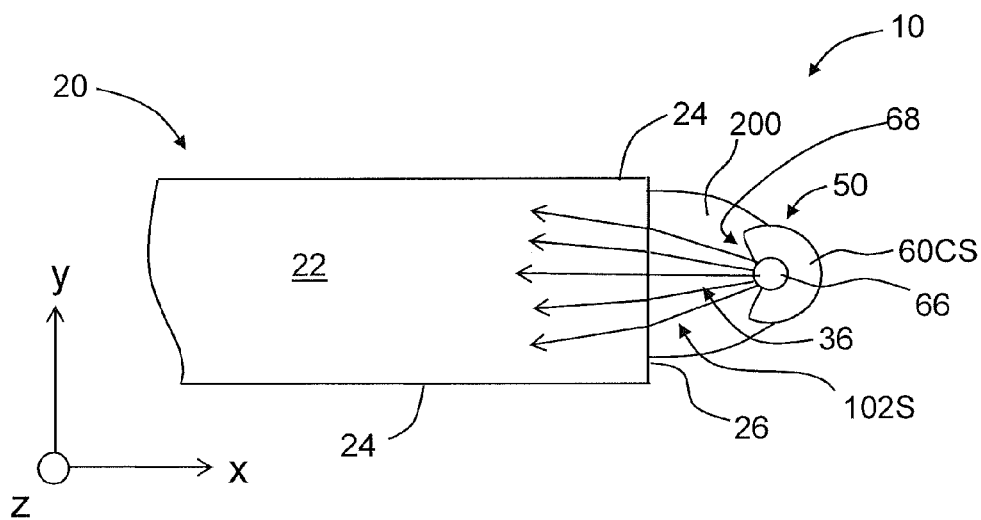
FIG. 5E is similar to FIG. 5C, and illustrates an example embodiment wherein a portion of the cladding is removed from the light-diffusing optical fiber along at least a portion of its length to define a cladding gap, with the cladding gap filled with an index-matching material.

FIG. 5E is similar to FIG. 5C, and illustrates an example embodiment wherein a portion of cladding 66 is removed from light-diffusing optical fiber 50 along at least a portion of its length so that core 60CS is exposed or the thickness of the cladding is substantially reduced. The removed portion of cladding 66 forms a gap 68 that is shown as being filled with index-matching material 200. In an example where core 60CS is exposed, silane may be applied to the exposed portion of the core to protect the core surface.

The configuration illustrated in FIG. 5E increases the amount of scattered light 102S that is emitted from core 60CS of light-diffusing optical fiber 50, with the increased amount of scattered light being directed substantially radially outward from the core and into gap 68. This configuration allows for the scattering loss in light-diffusing optical fiber 50 to be relatively high, e.g., up to the aforementioned 300 dB/m.

Figure 5F:
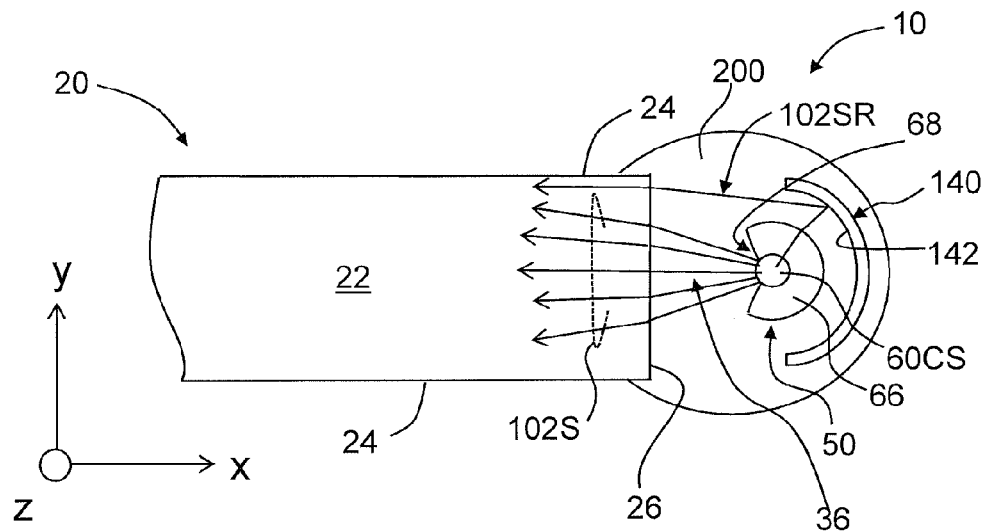
FIG. 5F is similar to FIG. 5D and illustrates an example embodiment where the light-diffusing optical fiber includes a cladding gap filled with an index-matching material.

FIG. 5F is similar to FIG. 5D and illustrates an example embodiment where light-diffusing optical fiber 50 includes gap 68 filled with index-matching material 200. Note that even though the light scattering is no longer isotropic, there is still a benefit to having reflecting member 140 reflect at least a portion of the scattered light back into transparent sheet 20 as scattered and reflected light 102SR.

Figure 5G:
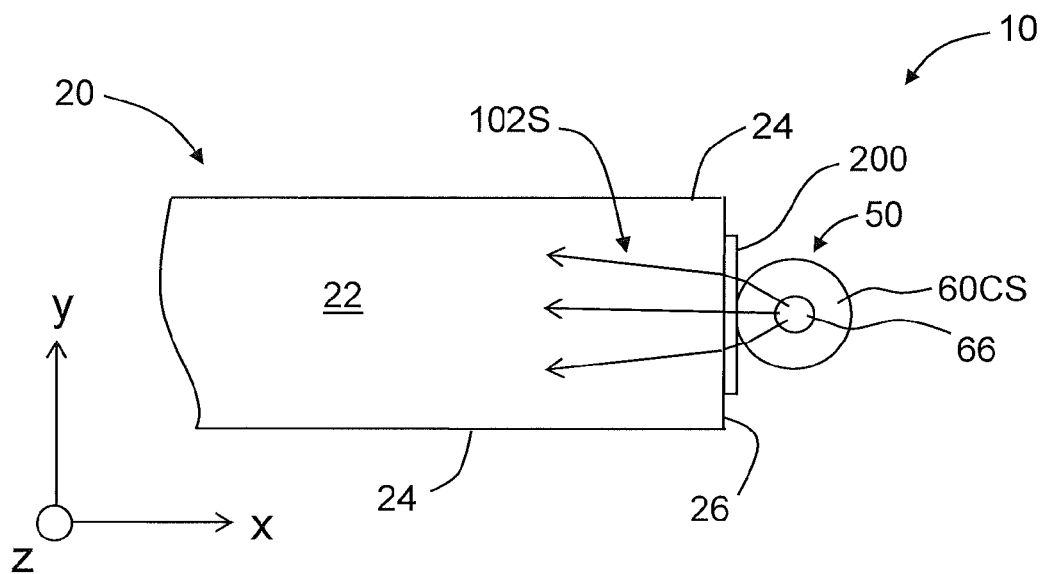
FIG. 5G is similar to FIG. 5A, and illustrates an example embodiment wherein the index-matching material is in the form of an adhesive strip applied to the edge of the transparent sheet.

FIG. 5G is similar to FIG. 5A, and illustrates an example embodiment wherein index-matching material 200 is in the form of an adhesive strip applied to edge 26 of transparent sheet 20. Index-matching adhesive strip 200 serves to support light-diffusing optical fiber 50 relative to edge 26 and also serves the above-described index-matching function that enhances the coupling of scattered light 102S into transparent sheet body 22 through edge 26.

Figure 5H:
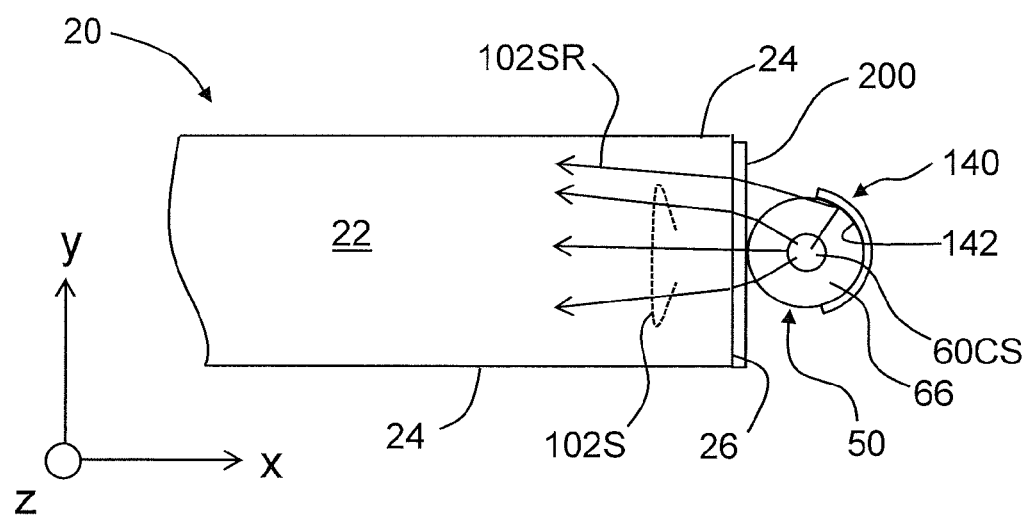
FIG. 5H is similar to FIG. 5G and further includes a reflective member operably disposed on a portion of the cladding.

FIG. 5H is similar to FIG. 5G and further includes reflective member 140 operably disposed on or adjacent a portion of cladding 66 opposite transparent sheet 20. In an example, reflective member 140 comprises reflective tape or a reflective film deposited directly onto the portion of cladding 66.

Figure 5I:
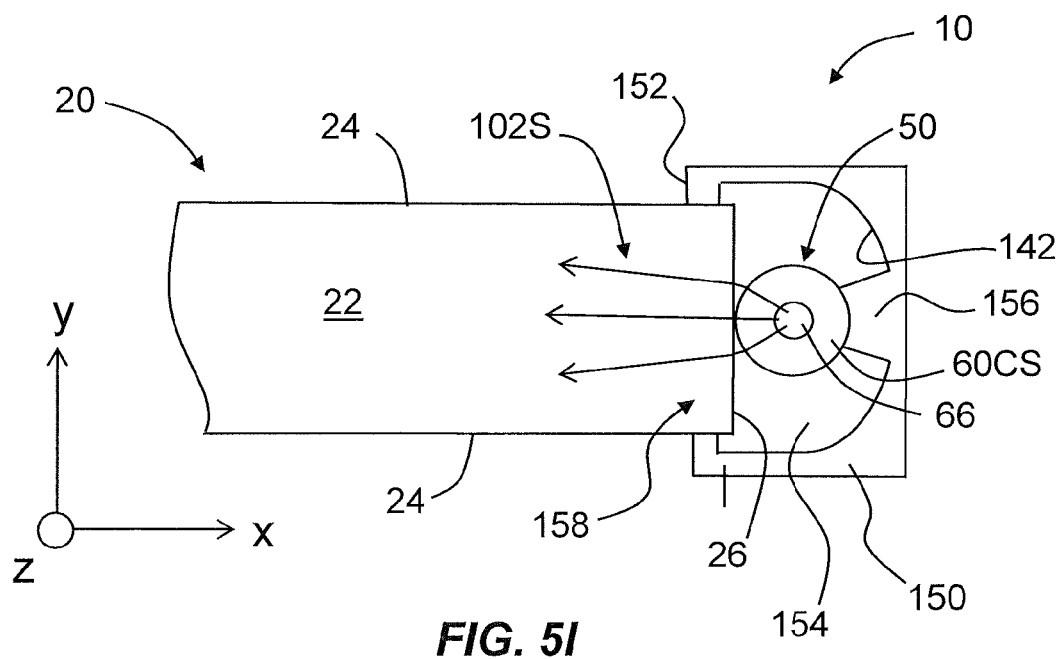
FIG. 5I and FIG. 5J are similar to FIG. 5G, and illustrate example embodiments that include a support member configured to support the light-diffusing optical fiber relative to the transparent sheet.

FIG. 5I is similar to FIG. 5G, and illustrates an example embodiment that includes a support member 150 configured to support light-diffusing optical fiber 50 relative to transparent sheet 20. Support member 150 has a front end 152 and an internal cavity 154 open at front end 152. In an example, cavity 154 includes a reflective rear surface 142 that can be curved as shown, or can be planar. In an example, support member 150 is a unitary structure formed by molding. In an example, support member 150 includes a support mount or stem 156 to which light-diffusing optical fiber 50 can be mounted. Also in an example, support member 150 can be configured to support multiple light-diffusing optical fibers 50.

Figure 5J:
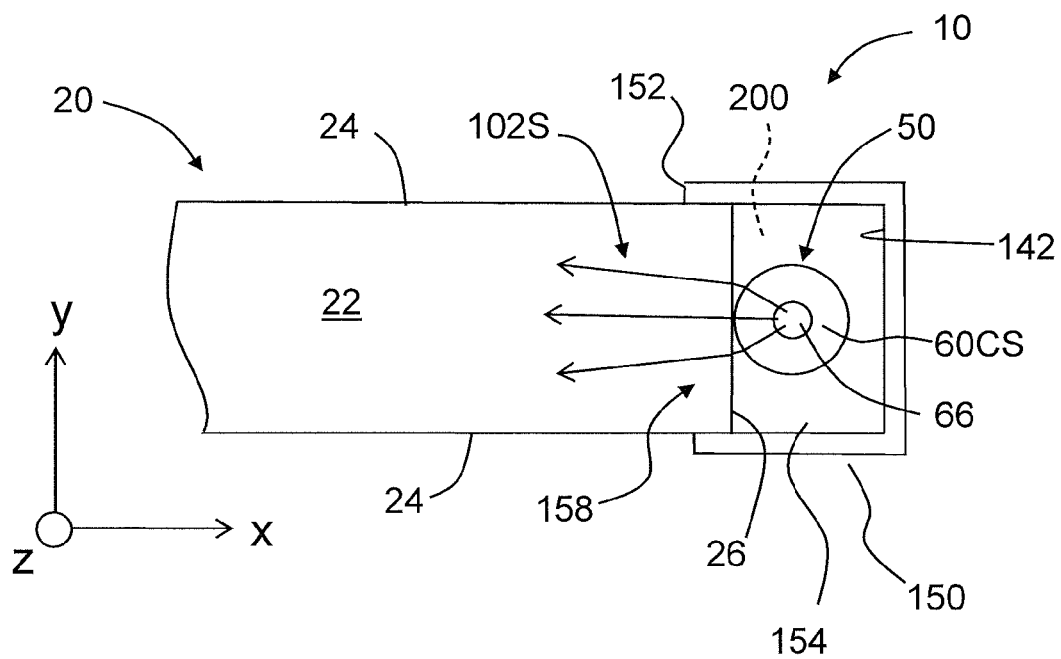

In an example, front end 152 of support member 150 defines an aperture 158 sized to the thickness TH20 of transparent sheet 20 so that support member 150 can slidingly and snugly engage a portion of transparent sheet at edge 26 by gripping upper and lower surfaces 24. In an example, front end 152 is compliant to facilitate gripping upper and lower surfaces 24 of transparent sheet 20. FIG. 5J is similar to FIG. 5I and illustrates an example support member 150 formed, for example, using reflective tape. In an example, internal cavity 154 can optionally be filled with index-matching material 200 to operably support light-diffusing optical fiber 50 within the internal cavity.

Figure 5K:
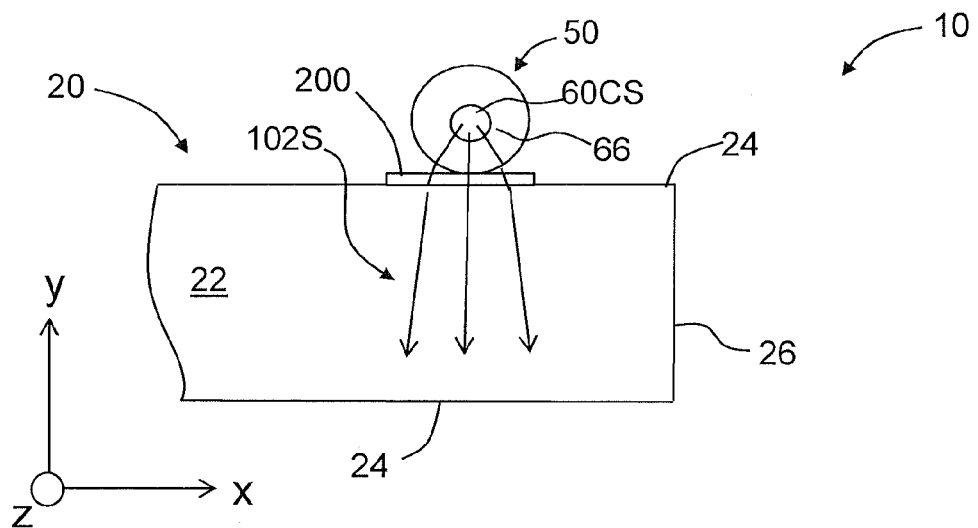
FIG. 5K is similar to FIG. 5G, except that the index-matching adhesive strip and the light-diffusing optical fiber reside adjacent the upper surface of the transparent sheet.
Figure 5L:
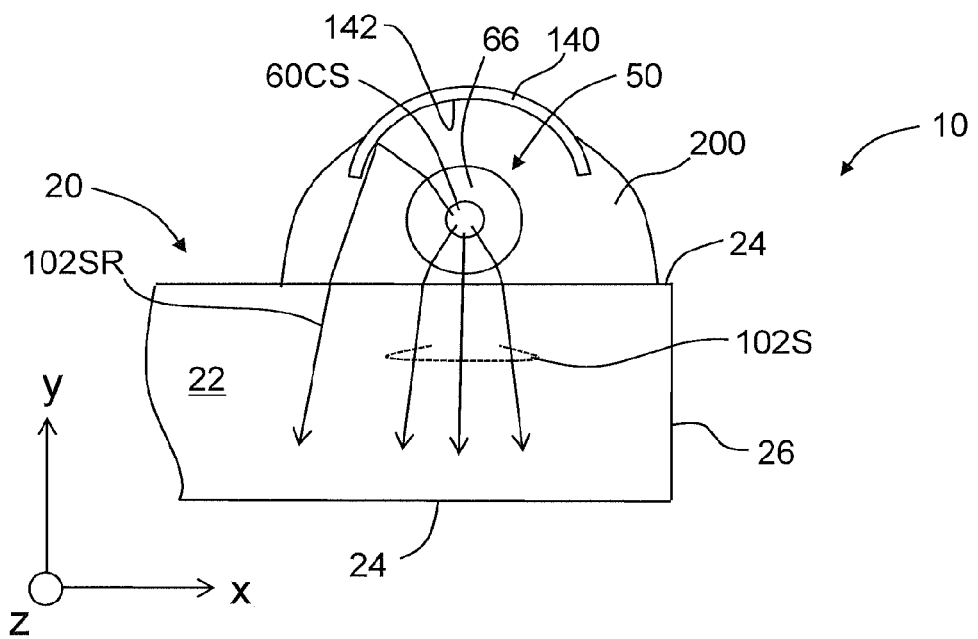
FIG. 5L is similar to FIG. 5K, with the index-matching material supporting both the light-diffusing optical fiber and an operably arranged reflecting member.

FIG. 5K is similar to FIG. 5G, except that index-matching adhesive strip 200 and light-diffusing optical fiber 50 reside adjacent upper surface 24 of transparent sheet 20. FIG. 5L is similar to FIG. 5K, except that index-matching material 200 is used to support both light-diffusing optical fiber 50 and reflecting member 140.

Figure 5M:
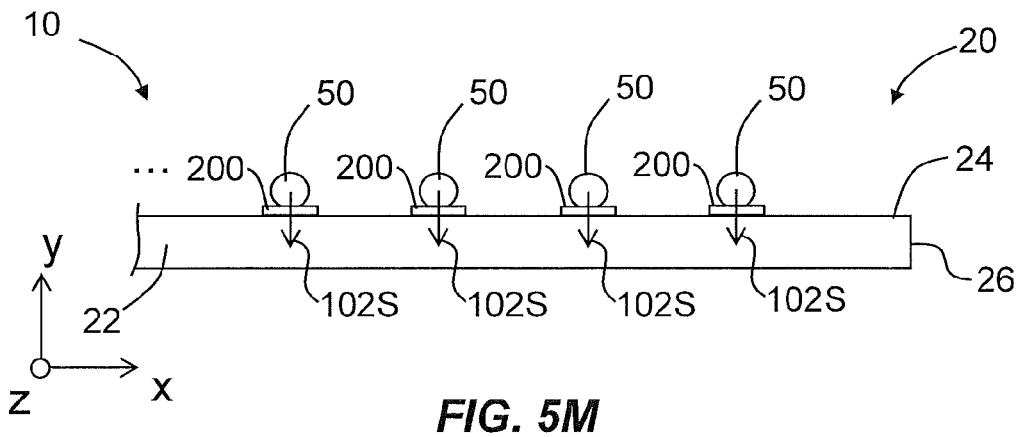
FIG. 5M is similar to FIG. 5K, and illustrates multiple light-diffusing optical fibers adhered to the upper surface of the transparent sheet.

FIG. 5M is similar to FIG. 5K, and illustrates multiple light-diffusing optical fibers 50 adhered to transparent sheet upper surface 24 via respective index-matching adhesive strips 200. In an alternative example, a single index-matching adhesive strip 200 can be employed. This configuration provides multiple locations for coupling scattered light 102S into transparent sheet body 22 through upper surface 24. In examples, this same configuration can be formed on lower surface 24 in addition to or as an alternative to the upper-surface configuration.

Figure 5N:
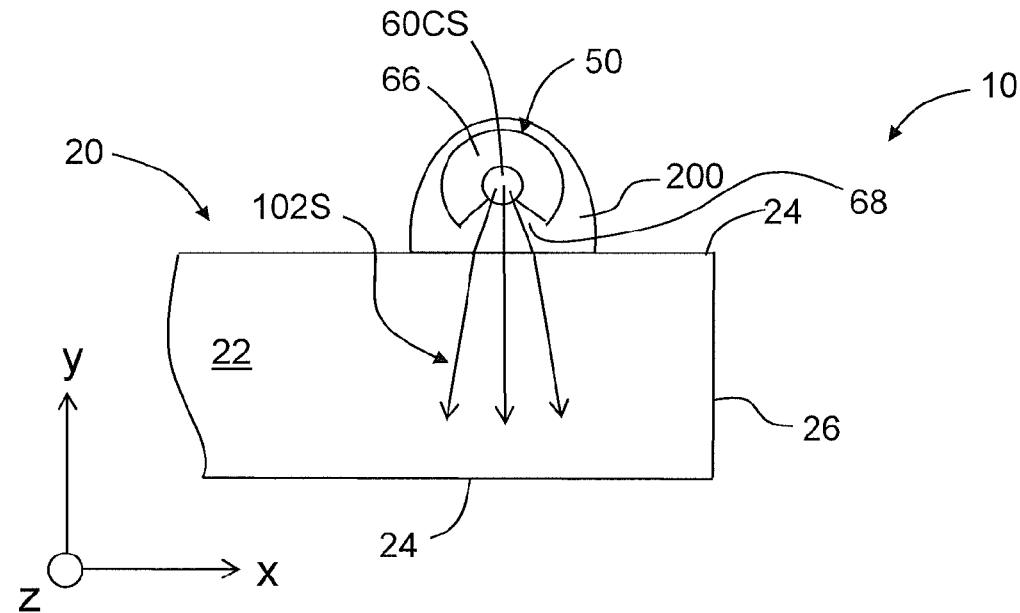
FIG. 5N is similar to FIG. 5L, except that there is no reflecting member, and a light-diffusion optical fiber has a cladding gap.

FIG. 5N is similar to FIG. 5L, except that there is no reflecting member 140, and a portion of cladding 66 has been removed to form the aforementioned cladding gap 68. This configuration allows for scattered light 102S to exit light-diffusing optical fiber 50 at cladding gap 68 and enter transparent sheet body 22 from upper surface 24.

Figure 5O:
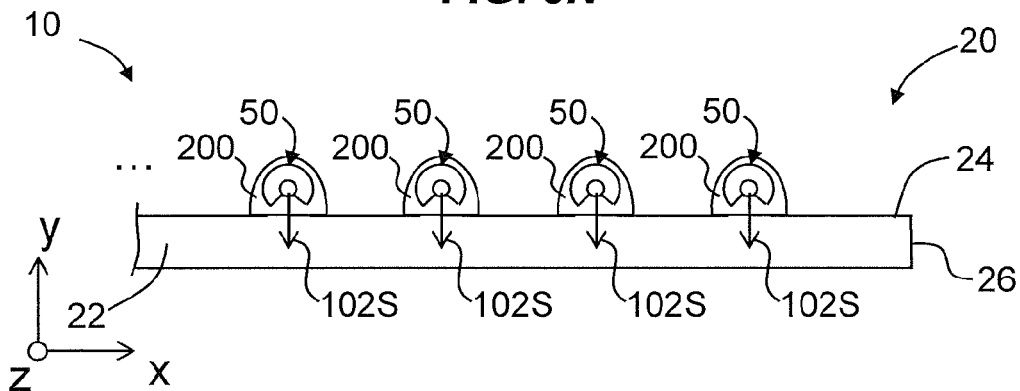
FIG. 5O is similar to FIG. 5K, and illustrates multiple light-diffusing optical fibers as configured in FIG. 5M adhered to the upper surface of the transparent sheet.

FIG. 5O is similar to FIG. 5K and FIG. 5M, and illustrates multiple light-diffusing optical fibers 50 adhered to transparent sheet upper surface 24 via respective index-matching material portions 200. In an alternative example, a single index-matching layer 200 can be employed. This configuration provides another method of providing multiple locations for coupling scattered light 102S into transparent sheet body 22 via one or both of upper and lower surfaces 24 (upper surface 24 is shown by way of illustration).

Figure 6A:
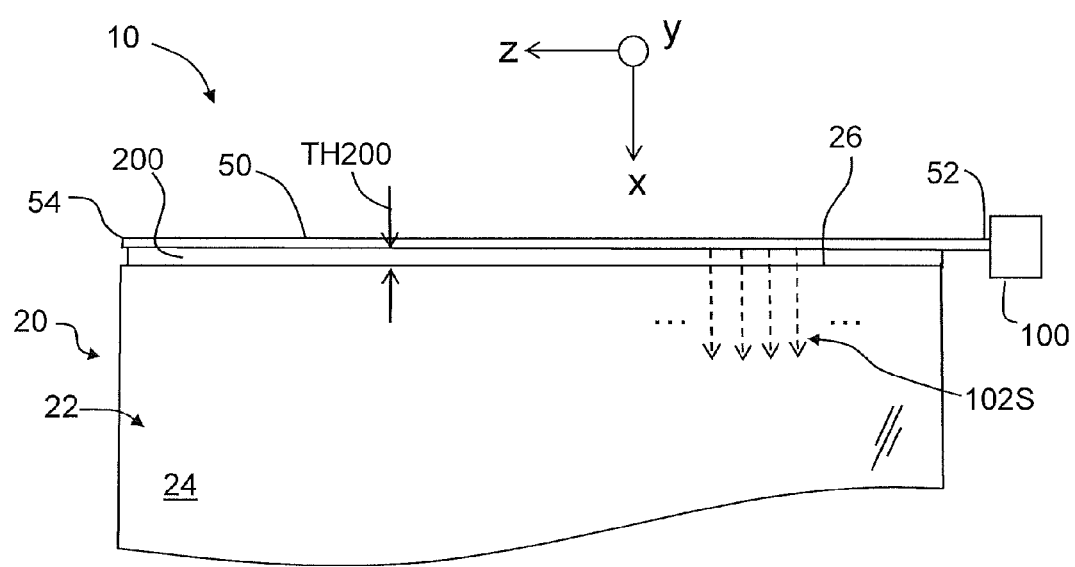
FIG. 6A is similar to FIG. 1 and illustrates an example embodiment wherein index-matching material has an index of refraction $n_{200}$ that varies as a function of distance z along the length of the light-diffusing optical fiber.
Figure 6B:
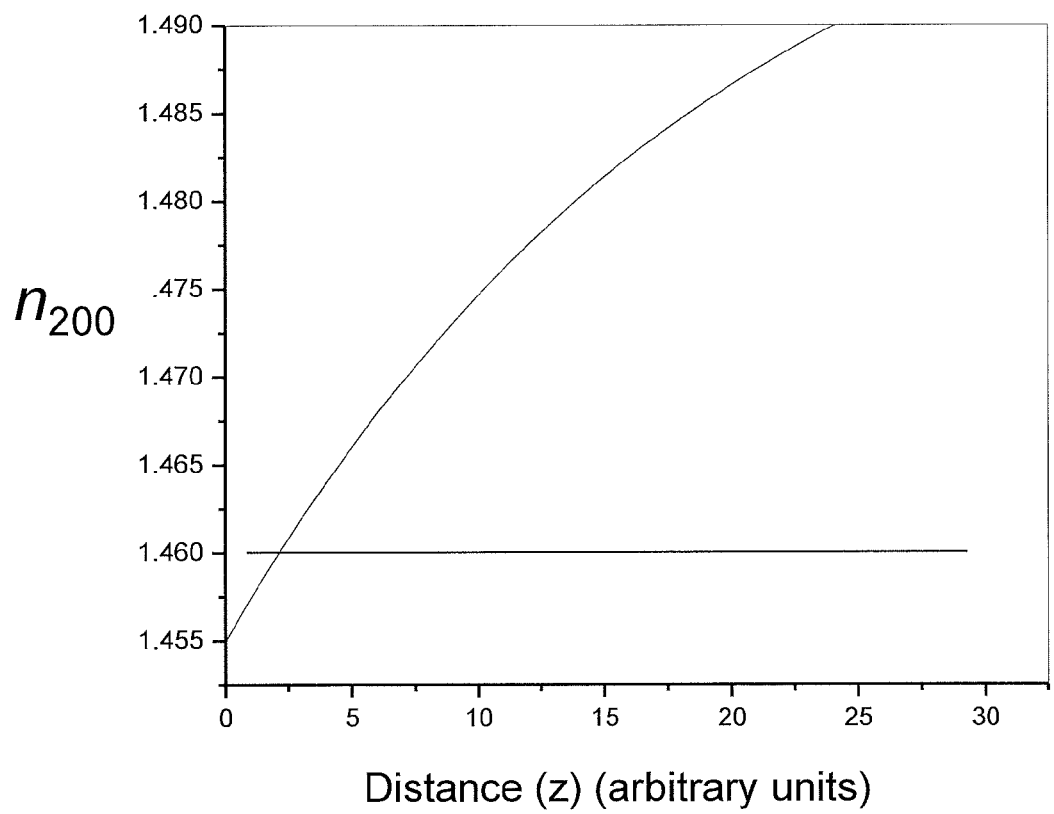
FIG. 6B is a plot of an example profile of the index of refraction $n_{200}$ of the index-matching material versus the distance z along the length of the light-diffusing optical fiber.

FIG. 6A is similar to FIG. 1 and illustrates an example embodiment wherein index-matching material 200 has an index of refraction $n_{200}$ that varies as a function of distance z (i.e., distance along the light-diffusing optical fiber 50) that at least partially compensates for the decrease in the intensity $I_S$ of scattered light 102S from the light-diffusing optical fiber 50 with distance along the optical fiber. FIG. 6B is a plot of an example profile of index of refraction $n_{200}$ versus distance z. The thickness TH200 of the index-matching material 200 is about 10 microns. The (effective) refractive index of core 60 is $n_{60}=1.46$, as indicated by the solid horizontal line in the plot. Transparent sheet 20 is made of glass having a refractive index $n_{20}=1.5$. The varying refractive index profile $n_{200}(z)$ for the index-matching material 200 has a value of 1.455, which is just below the core index $n_{60}$ of 1.460 at or near the coupling end 52 of light-diffusing optical fiber 50, and increases to a value of 1.49 towards the terminal end 54. As the refractive index $n_{200}$ of the index-matching material 200 increases, and increasing amount of light is scattered from core 60. This serves to at least partially counteract the diminished amount of light scattering with distance inherent in light-diffusing optical fiber 50.

Figure 6C:
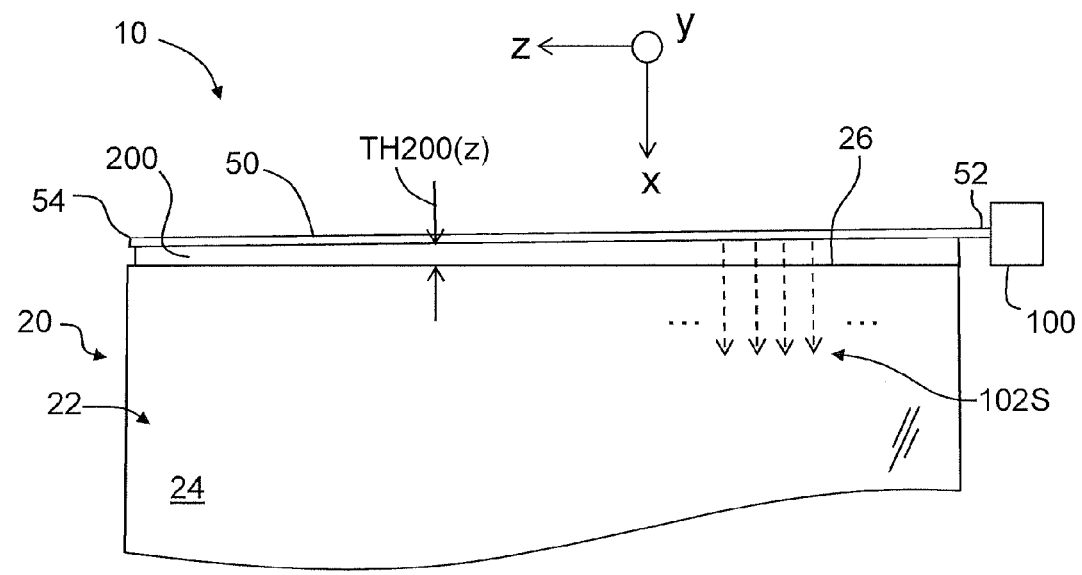
FIG. 6C and FIG. 6D are similar to FIG. 6A and illustrate example embodiments where the thickness of the index-matching material varies with distance z along the length of the optical fiber.
Figure 6D:
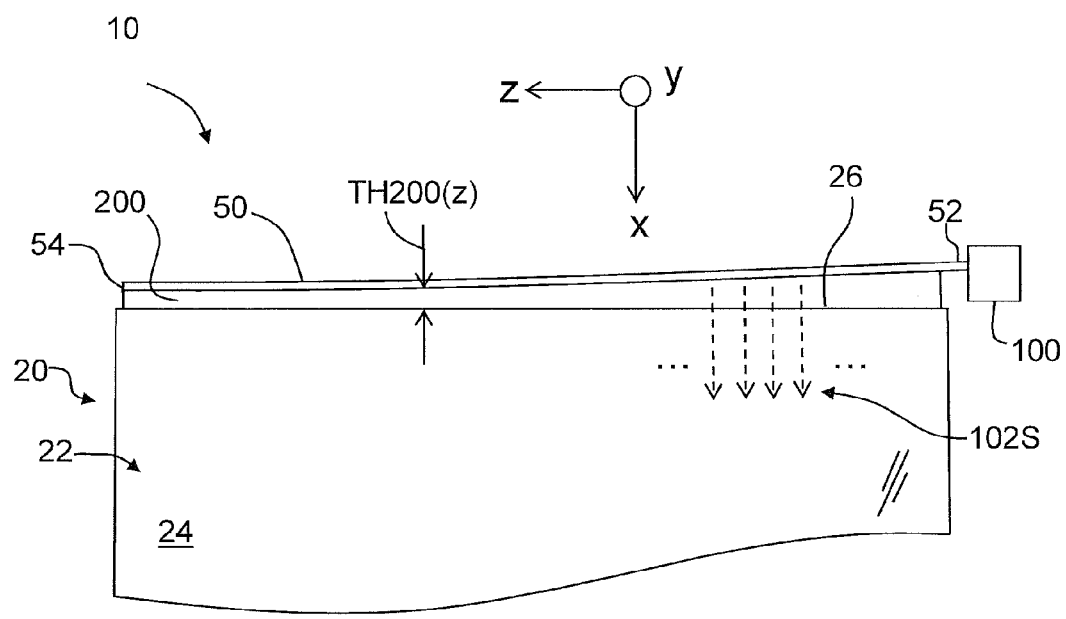

FIG. 6C and FIG. 6D are similar to FIG. 6A and illustrate example embodiments where the thickness TH200 of index-matching material 200 varies with distance (z), i.e., TH200=TH200(z). A greater thickness TH200 corresponds to a greater amount of attenuation of scattered light 102S. Thus, at or near coupling end 52 of light-diffusing optical fiber 50, the thickness TH200(z) is greatest and it monotonically decreases to a minimum thickness at or near terminal end 54. FIG. 6C illustrates an example linearly varying thickness profile TH200(z), while FIG. 6D illustrates an example curved thickness profile TH200(z). The particular thickness profile TH200(z) is determined by the loss characteristics of light-diffusing optical fiber 50.

In an example embodiment, thickness profile TH200(z) is configured to substantially compensate for the variation in intensity Is of the scattered light 102S with distance along at least a portion of light-diffusing optical fiber 50 so that the scattered light intensity $I_S$ is substantially uniform along the portion of the length of the light-diffusing optical fiber.

In another example embodiment, light-diffusing optical fiber 50 is configured so that the scattered light intensity $I_S$ is substantially constant as a function of distance along the light-diffusing optical fiber. This can be accomplished, for example, by changing the temperature during the optical fiber drawing process, which serves to change the size of voids 64 in core void region 60V. The smaller the voids 64 are, the greater the loss in the optical fiber 50. Thus, in an example embodiment, light-diffusing optical fiber 50 is configured so that it emits scattered light 102S with substantially constant intensity $I_S$ over at least a portion of its length. Example methods of forming such a light-diffusing optical fiber 50 are disclosed in U.S. patent application Ser. No. 12/950,045, which Application is incorporated by reference herein. Example methods of forming optical fibers with randomly arranged voids are disclosed in U.S. Pat. No. 7,450,806, which patent is incorporated by reference herein.

Figure 6E:
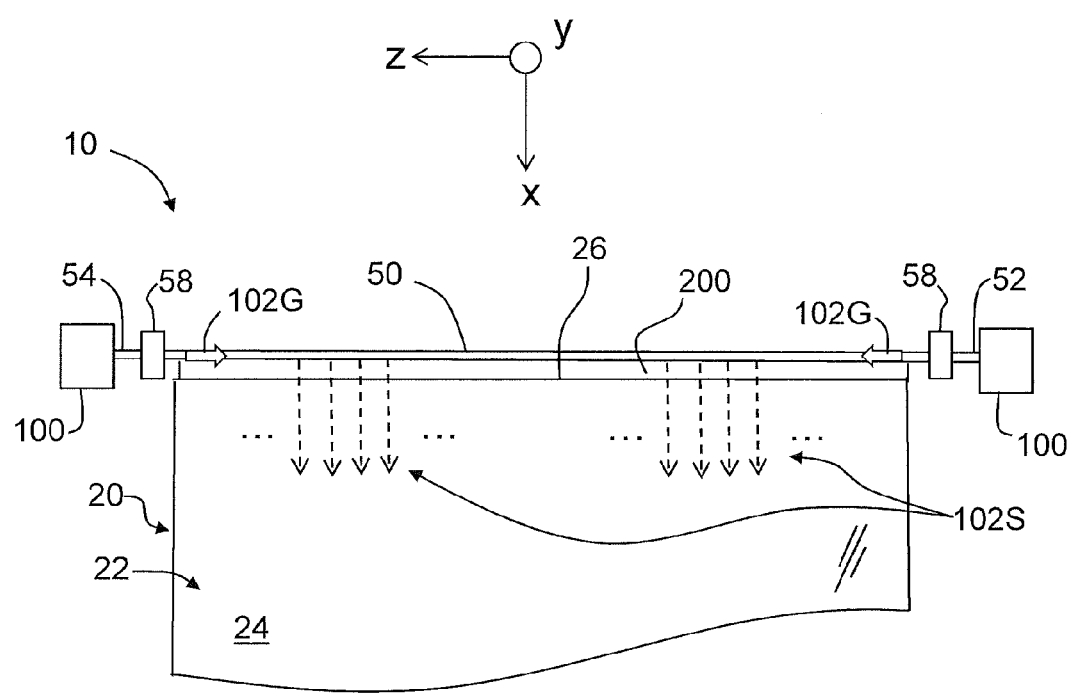
FIG. 6E is similar to FIG. 6A and illustrates an example embodiment where the light-diffusing optical fiber is optically coupled to two light sources.

FIG. 6E is similar to FIG. 6A and illustrates an example embodiment where light-diffusing optical fiber 50 is optically coupled to two light sources 100 at respective ends 52 and 54. Optical isolators 58 are optionally employed adjacent each light source 100 to prevent light from one light source 100 entering the other light source. The symmetry of this two-source configuration results in substantially uniform intensity $I_S$ of scattered light 102S.

Figure 6F:
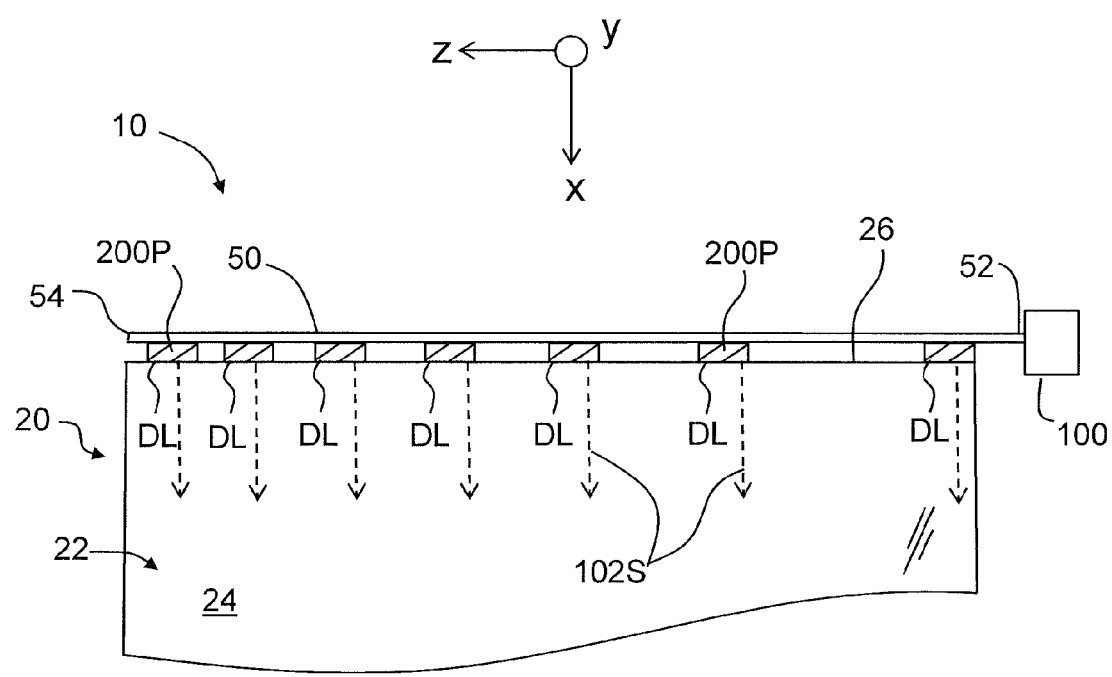
FIG. 6F is similar to FIG. 6A and illustrates an example embodiment where the index-matching material (shown in cross-hatch for ease of viewing) is not continuous and is provided in discrete portions at discrete locations along the length of the light-diffusion optical fiber between the optical fiber and the transparent sheet.

FIG. 6F is similar to FIG. 6A and illustrates an example embodiment where the index-matching material 200 (shown now in cross-hatch for ease of viewing) is not continuous and light diffusing optical fiber 50 is optically coupled to (an in one example, is attached to) transparent sheet 20 (e.g., at edge 26, as shown) using a number of portions 200P of index-matching material 200 at a number of discrete locations DL. In an example, the density of the discrete locations DL where index-matching material portions 200P resides changes along the length of light-diffusing optical fiber 50 from input end 52, with a relatively low density towards coupling end 52 and relatively high density towards terminal end 54. The portions 200P of index-matching material 200 at each discrete location DL are shown in one embodiment as being essentially the same for ease of illustration. However, different sized portions 200P of index-material material 200 can also be used at different discrete locations DL. In an example, the particular configuration of index-matching material portions 200P and discrete locations DL is selected to provide for substantially uniform amounts (i.e., intensity $I_S$) of scattered light 102S entering transparent sheet body 22 along the corresponding portion of the length of light-diffusing optical fiber 50.

Figure 7A:
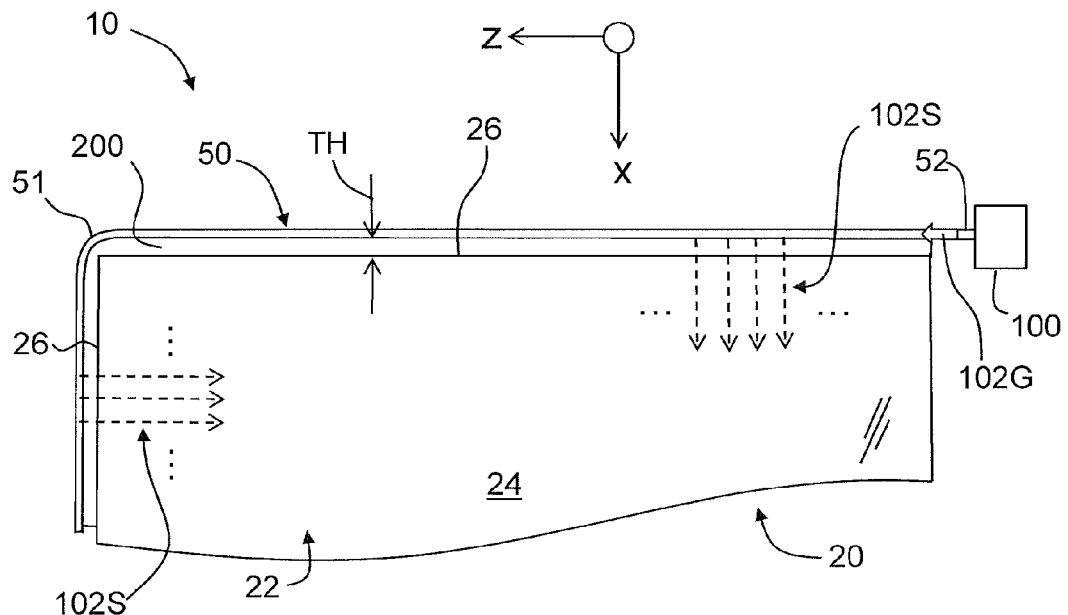
FIG. 7A is similar to FIG. 6A, and illustrates an embodiment wherein the light-diffusing optical fiber includes a bend that allows the optical fiber to reside adjacent two edges of the transparent sheet.

FIG. 7A is similar to FIG. 6A, and illustrates an embodiment of system 6 wherein light-diffusing optical fiber 50 includes a bend 51 that allows the optical fiber to reside adjacent two edges 26 of transparent sheet 20, as shown. This allows for scattered light 102S to enter transparent sheet 26 at the both edges 26, thereby coupling more light into transparent sheet 20. Generally, one or more bends 51 can be employed in a single light-diffusing optical fiber 50 so that portions of the optical fiber can reside adjacent corresponding two or more edges 26 of transparent sheet 20.

Figure 7B:
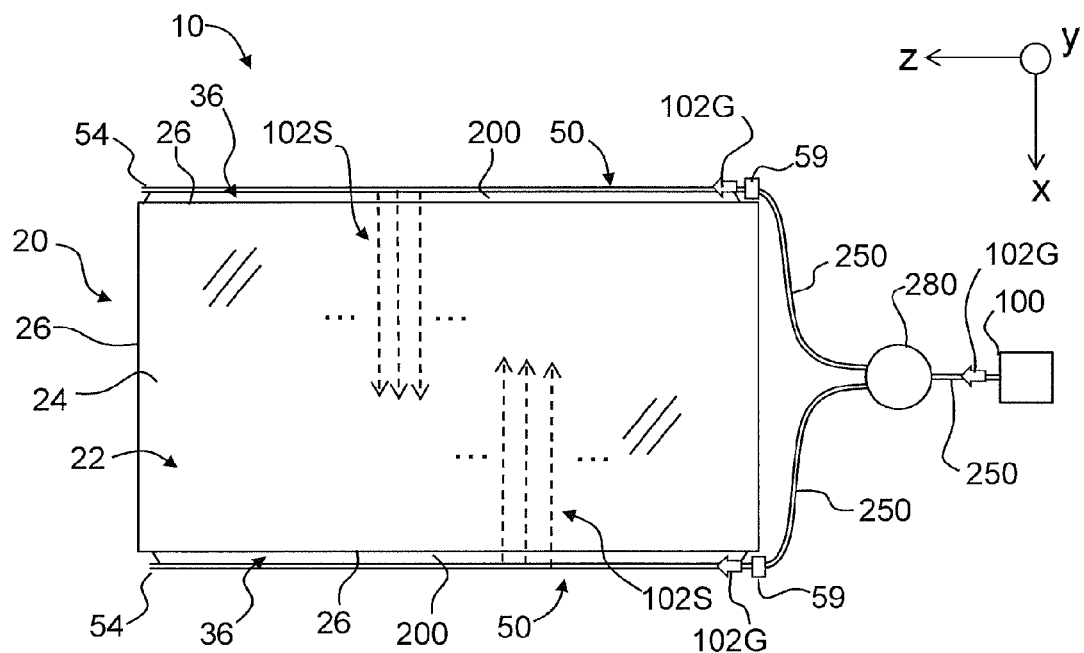
FIG. 7B is similar to FIG. 7A and illustrates an example embodiment that employs multiple light-diffusing optical fibers along different edges of the transparent sheet.

FIG. 7B is similar to FIG. 7A and illustrates an example embodiment of system 6 that employs multiple light-diffusing optical fibers 50 along different edges 26 of transparent sheet 20. System 6 of FIG. 7B employs three sections of non-light-diffusing optical fiber 250. A first section of optical fiber 250 optically connects light source 100 to a 1×2 coupler 280. The second and third sections of optical fiber 250 optically connect the optical coupler 280 to first and second light-diffusing optical fibers 50 that are operably arranged on opposite edges 26 of transparent sheet 20. In an example, the second and third sections of optical fiber 250 are optically connected to the respective light-diffusing optical fibers 50 via splicing members 59, which can be mechanical connectors.

Figure 7C:
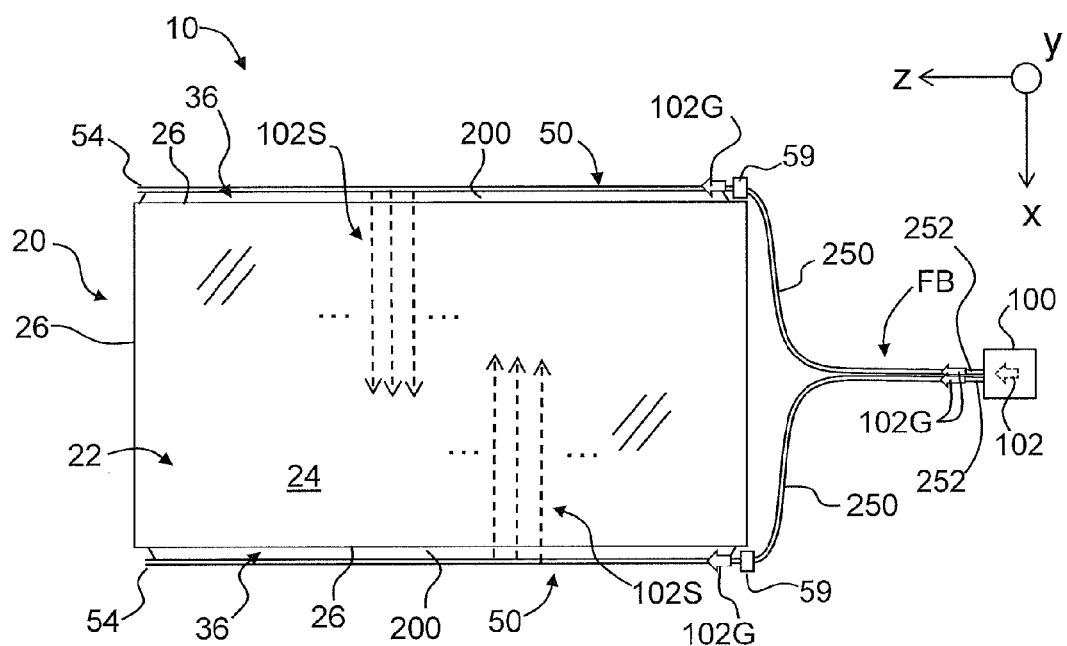
FIG. 7C is similar to FIG. 7B and illustrates an example embodiment where the ends of the non-light-diffusing optical fibers are brought together to form a fiber bundle.

In an alternate embodiment illustrated in FIG. 7C, rather than use a single non-light-diffusing optical fiber 250 and a circulator 280, two non-light-diffusing optical fibers 250 are brought together to form an optical fiber bundle FB at light source 100. Light 102 is then coupled directly into the two optical fiber ends 252. Likewise, in another embodiment, multiple light sources 100 can be used, one for each non-light-diffusing optical fiber 250 in optical fiber bundle FB.

Figure 7D:
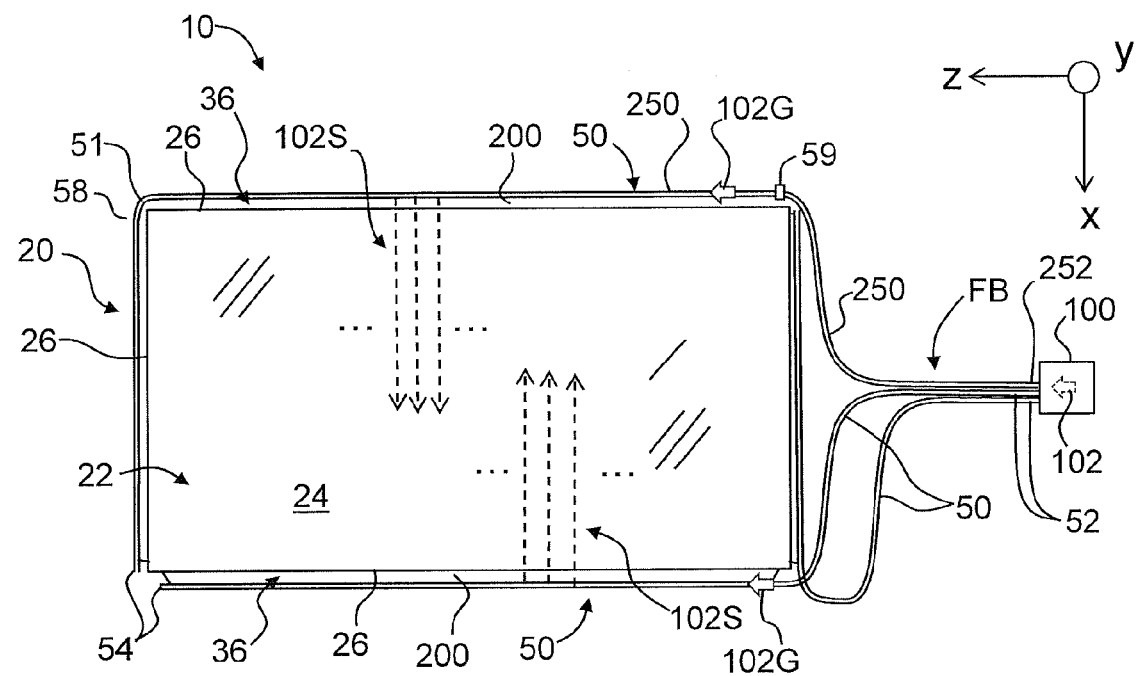
FIG. 7D illustrates an embodiment similar to FIG. 7C where three light-diffusing optical fibers and one non-light-diffusing optical fiber converge to form a fiber bundle, and where the three light-diffusing optical fibers are configured to provide coverage of all four edges of the transparent sheet.

Generally speaking, optical fiber bundle FB can include non-light-diffusing optical fibers 250, light-diffusing optical fibers 50, or a combination thereof, with at least portions of two or more light-diffusing optical fibers 50 operably arranged adjacent corresponding respective edges 26 and/or surfaces 24 of transparent sheet 20. FIG. 7D illustrates an embodiment similar to FIG. 7C where two light-diffusing optical fibers 50 and one non-light-diffusing optical fiber 250 converge to form fiber bundle FB. The two light-diffusing optical fibers 50 are configured to provide coverage of all four edges 26 of the rectangular-shaped transparent sheet 20. A section of the non-light-diffusing optical fiber 250 is optically connected (e.g., via splice 59) to the light-diffusing optical fiber 50 that includes a bend 51 that allows this particular optical fiber to operably reside adjacent two edges 26 of transparent sheet 20. As is clearly depicted in the embodiment of FIG. 7D, the length of the light-diffusing optical fiber 50 that is positioned adjacent to the perimeter 11 (see FIG. 10) is approximately equal to or less than the perimeter of the transparent sheet 20.

Figure 8:
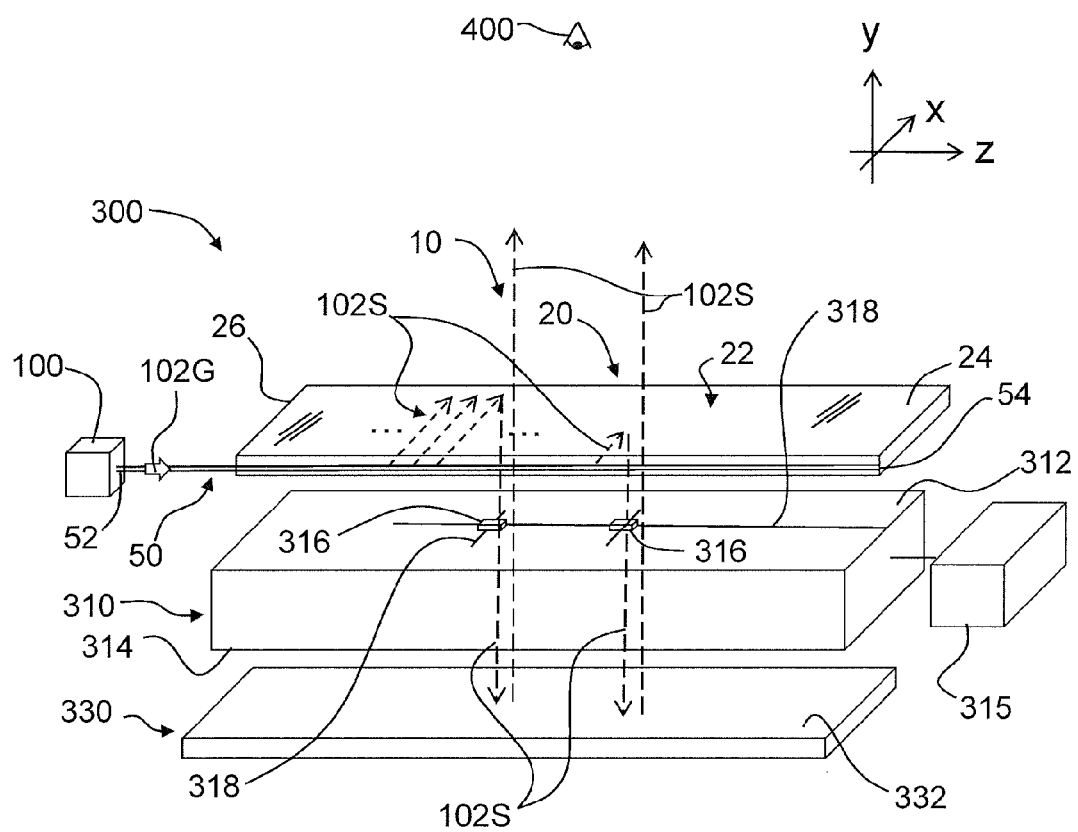
FIG. 8 is an exploded elevated view of an example flat-screen device that includes the light-coupling optical system of the disclosure.

FIG. 8 is an exploded elevated view of an example flat-screen device 300 that includes system 6 of the present disclosure. Flat-screen device 300 includes a light-modulation display assembly 310 having an upper surface 312 and a lower surface 314. Light-modulation display assembly 310 is electrically connected to light-modulation electronics 315. Transparent sheet 20 resides on or adjacent upper surface 312 of light-modulation display assembly 310. In an example, light-modulation display assembly 310 includes a plurality of pixels 316 that are addressable by light-modulation electronics 315 via transparent electrical connections 318. Transparent electrical connections 318 typically have a grid-like configuration (e.g., of source and gate bus lines), and only select electrical connections are illustrated for ease of illustration. An example light-modulation display assembly 310 is a liquid-crystal display assembly that includes a liquid-crystal matrix that defines an array of liquid-crystal cells (pixels) sandwiched by cross-polarizers. An example reflective liquid-crystal display assembly is disclosed in U.S. Pat. No. 6,404,471, which is incorporated by reference herein.

Flat-screen device 300 also includes a reflecting member 330 having a reflective surface 332. Reflecting member 330 resides adjacent light-modulation assembly lower surface 314.

In the operation of flat-screen device 300, scattered light 102S is coupled into transparent sheet 20, say at edge 26, in the manner described above. In other examples, scattered light 102S is coupled into transparent sheet 20 using any of the other example embodiments discussed above. At least a portion of this scattered light 102S is then re-directed by transparent sheet 20, e.g., by scattering from rough upper surface 24, to travel to light-modulation display assembly 310. This scattered light 102S travels through the light-modulation display assembly 310 and is reflected by reflecting surface 332 of reflecting member 300 to travel back through the light-modulation display assembly, where it exits transparent sheet 20 and is seen by a viewer 400. Thus, scattered light 102S is modulated by passing twice through light-modulation display assembly 310, with the modulation determined by the operation of light-modulation electronics 315. The result is a display image that is visible to viewer 400.

Light-coupling Optical System with Index-matching Layer

Figure 9A:
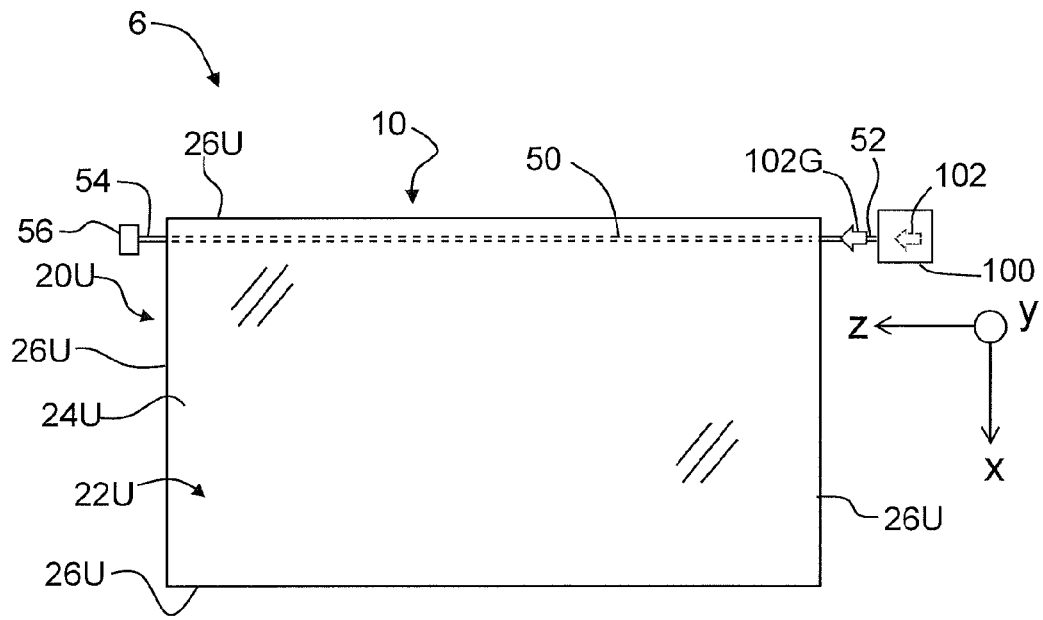
FIGS. 9A and 9B are top-down views of an example light-coupling optical system according to the disclosure.
Figure 9B:
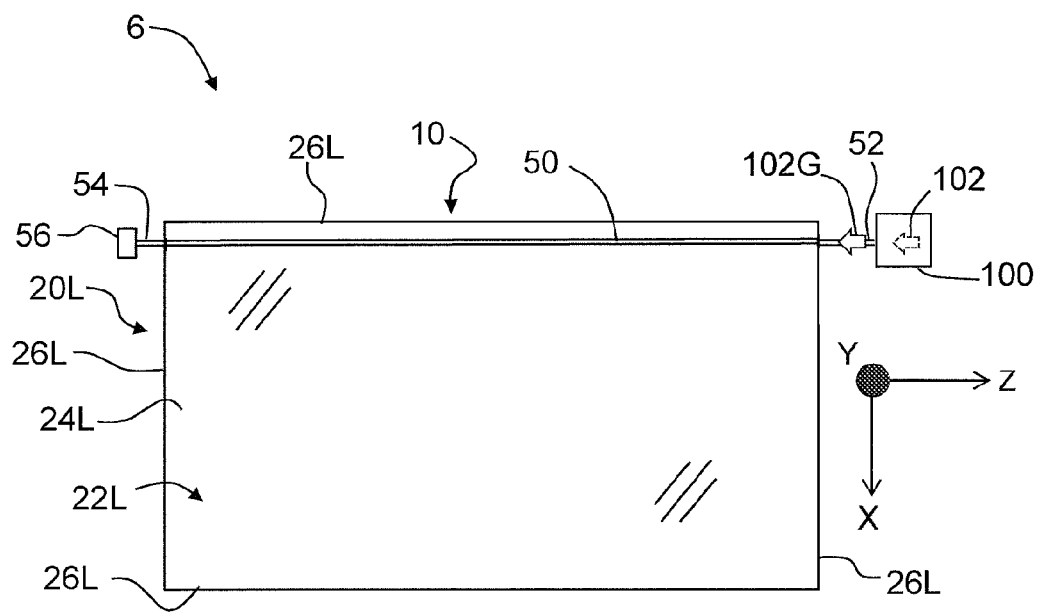
Figure 10:
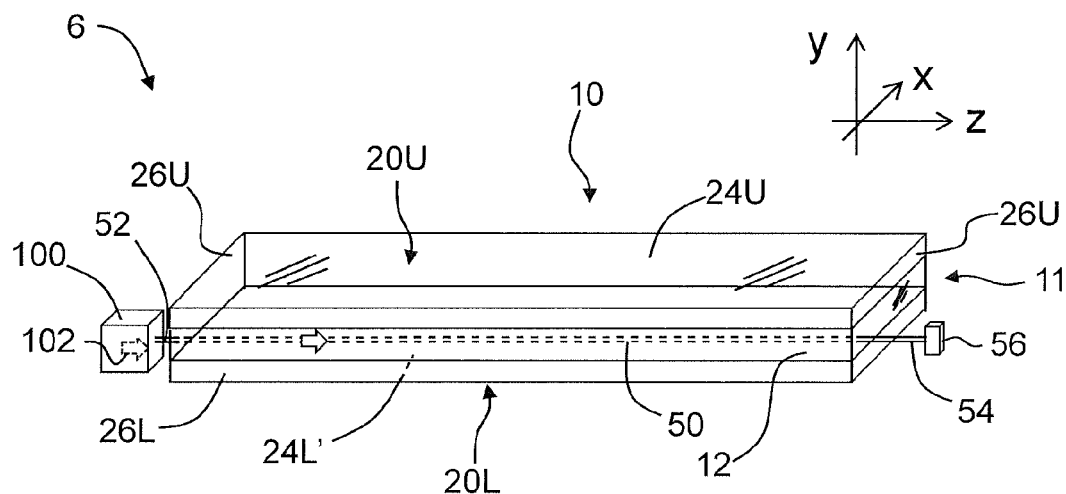
FIG. 10 is a side elevated view of the light-coupling optical system of FIG. 1.
Figure 11:
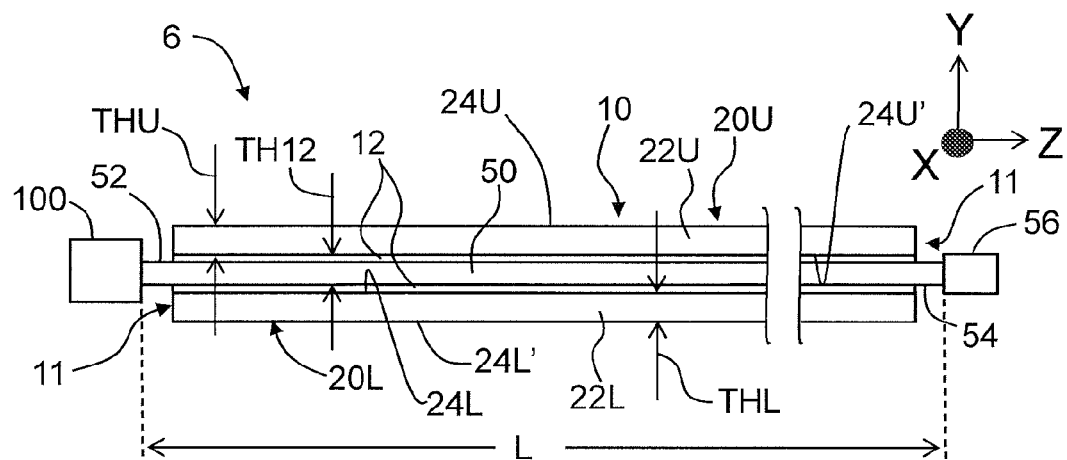
FIG. 11 is a cross-sectional view of the light-coupling optical system of FIG. 2 as taken in the Y-Z plane.

FIG. 9A is a top-down view and FIG. 9B is a bottom-up view of another example embodiment of a light-coupling optical system ("system") 6 according to the disclosure. FIG. 10 is an elevated view of the light-coupling optical system 6 of FIG. 9A FIG. 11 is a cross-sectional view of system 6 as taken in the Y-Z plane, while FIG. 12A is a cross-sectional view of the system as taken in the X-Y plane.

System 6 is similar to that shown in FIG. 1 and FIG. 2 and includes an optical assembly 10 that has at least an upper transparent sheet ("upper sheet") 20U and optionally includes a lower sheet 20L, which may also be transparent but that can also be opaque, semi-opaque, partially reflective or substantially reflective. Sheets 20U and 20L are arranged spaced apart and substantially parallel to one another.

Optical assembly 10 includes an index-matching layer 12 sandwiched between upper and lower sheets 20U and 20L. In an example embodiment where system 6 includes no lower sheet 20L, then index-matching layer 12 resides immediately adjacent upper sheet 20U, as illustrated in the cross-sectional view of FIG. 12B. Index-matching layer 12 is configured to have a refractive index that substantially matches that of upper sheet 20U. An example material for index-matching layer 12 is an ultra-violet-(UV)-curable polymer. In an example, index-matching layer 12 is adhesive, e.g., comprises an adhesive polymer. In an example, index-matching layer 12 is configured to scatter light, e.g., includes a light scattering substance (see FIG. 15B). Example materials for index-matching layer thus include: a polymer, a doped polymer, a polymer having an adhesive property, a polymer with low absorption in the wavelength range between 400 nm and 700 nm, a thermally curable polymer, a photo-curable polymer, or combinations thereof.

With regard to the embodiment of optical assembly 10 that includes upper and lower sheets 20U and 20L, the upper sheet has a body 22U that defines a thickness THU (see FIG. 11), opposite upper and lower (i.e., top and bottom) substantially planar and substantially parallel surfaces 24U and 24U' (see FIG. 11) and one or more edges 26U, such as four edges 26U for a rectangular transparent sheet. Likewise, lower sheet 20L has a body 22L that defines a thickness THL (see FIG. 11), opposite upper and lower (i.e., top and bottom) substantially planar and substantially parallel surfaces 24L and 24L', and one or more edges 26L, such as four edges 26L for a rectangular transparent sheet.

Upper and lower transparent sheets 20U and 20L can be made of, for example, glass, plastic, display glass such as Corning's EAGLE XG®, EAGLE®, GORILLA® and PYREX® glasses, as well as fused silica, plastic materials like PPMA, a polymer, or any other transparent material. In an example, upper sheet 20U can be formed from multiple sheets, such as a sheet of glass coated with a polymer layer. Here, the term "transparent" generally means that the transparent sheet transmits light at least in the visible wavelength range, and transmits more light than it absorbs for the given thickness THU or THL.

In an example, at least one of the thickness THU of body 22U of upper sheet 20U and the thickness THL of body 22L of lower transparent sheet 20L is 0.3 mm or greater, and in another example is 0.7 mm or greater. In an example, at least one of upper sheet body 22U and lower sheet body 22L has a refractive index of about 1.5 or greater at 550 nm. In an example, upper sheet 20U comprises a glass layer as thin as about 100 microns and index-matching layer 12 comprises a polymer and has thickness TH12 as thin as 200 microns.

Optical assembly 10 of system 6 also includes at least one light-diffusing optical fiber 50 operably disposed so that a least a portion of the at least one light-diffusing optical fiber is at least partially embedded within index-matching layer 12. In examples, the at least one light-diffusing optical fiber 50 resides either immediately adjacent or slightly spaced apart from upper transparent sheet 20U with a portion of the index-matching layer in between. In an example, at least a portion of the at least one light-diffusing optical fiber 50 is entirely embedded within index-matching layer 12.

In an example, light-diffusing optical fiber 50 includes the aforementioned coupling end 52 and terminal end 54. Coupling end 52 and terminal end 54 define a length L (see FIG. 11) for light-diffusing optical fiber 50. System 6 also includes the aforementioned light source 100 optically coupled to optical assembly 10 and in particular to coupling end 52 of light-diffusing optical fiber 50. Light source 100 emits light 102, which as discussed above travels in light-diffusing optical fiber 50 as guided light 102G, as illustrated in the close-up cross-sectional view of FIG. 13. Light-diffusing optical fiber 50 is configured as described above to generate scattered light 102S from guided light 102G.

In an example, system 6 includes the aforementioned terminal optical member 56 operably disposed adjacent terminal end 54 of light-diffusing optical fiber 50. In one example, terminal optical member 56 is an optical absorber that absorbs light 102, while in another example it is an optical reflector that reflects light 102 (e.g., reflects guided light 102G) so that the reflected guided light travels in the opposite direction, i.e., toward light source 100. In such an example, an optical isolator (not shown) may be employed (e.g., adjacent light source 100) to prevent light 102 from returning to light source 100.

In an example embodiment, optical assembly 10 is configured to be flexible, i.e., is able to be bent to have a substantial curvature. In another example embodiment, optical assembly 10 is configured to be stiff, i.e., so that it is not able to be bent to have a substantial curvature.

With reference to FIGS. 12A and 12B, in an example embodiment, optical assembly 10 includes a perimeter 11 that includes side 26U of upper sheet 20U and can include sides 26L of lower sheet 20L. In an example embodiment, optical assembly includes at least one reflecting member 140 arranged adjacent at least a portion of perimeter 11. Reflecting surface 142 of reflecting member 140 may be configured to specularly reflect light or to diffusely reflect light.

The portion of scattered light 102S from light-diffusing optical fiber 50 that is within the critical angle as defined by the respective indices of refraction of upper sheet 20 and the surrounding medium (e.g., air, or a low-index layer, as described below), is trapped within optical assembly 10 by total internal reflection. In an example, a light-scattering feature 23U on upper surface 24U of upper sheet 20U serves to further scatter scattered light 102S that is trapped within optical assembly 10. This allows observer 400 to see scattered light 102S while viewing upper surface 24U of upper sheet 20U.

In an example, light-scattering feature 23U is localized while in another example covers substantially all of upper surface 24U. In an example, light-scattering feature 23U comprises a rough feature. In an example, light-scattering feature 23U is etched into upper surface 24U of upper sheet 20U using, for example, a laser (e.g., by laser etching). In an example, light-scattering feature 23U is added to upper sheet 20U as a light-scattering element rather than being integrally formed in upper surface 24 of the upper sheet.

FIG. 12C is a close-up cross-sectional view of an end portion of the optical assembly 10 illustrating an example embodiment where the reflecting member 140 has a U-shape and is arranged in contact with perimeter 11, upper sheet 20U and the index-matching layer 12. A portion of scattered light 102S from light-diffusing optical fiber 50 is incident upon reflecting member 140 and reflects therefrom, similar to that as described above in connection with FIG. 12B. This scattered light 102S also travels within optical assembly 10 via total internal reflection.

FIG. 12D is similar to FIG. 12C and illustrates an example embodiment where the reflecting member 140 is spaced apart from perimeter 11, upper sheet 20U and index matching layer 12 by an air gap 155 associated with the internal cavity 154 defined by the reflecting member.

FIG. 12E is similar to FIG. 12D, except that a portion of the light-diffusing optical fiber 50 extends from index-matching layer 12 at perimeter 11. FIG. 12F is similar to FIG. 12E, except that the light-diffusing optical fiber 50 resides entirely outside of the index matching layer 12 and is adjacent perimeter 11. FIG. 12G is similar to FIG. 12C and illustrates an example embodiment wherein reflecting member 140 has an angled portion 141 defined by an angle α relative to the Y-direction. Angled portion 141 can be used to reduce the amount of loss as compared to a U-shaped reflecting member 140 used in the same geometry for optical assembly 10. The top portion of reflecting member 140 can define a bezel 143 having a dimension (length) d.

In an example, the dimension d of reflecting member 140 as shown in FIGS. 12C through 12F can be in the range $0 \leq d \leq 4$ mm. In another example, reflecting member 140 is configured so that length d provides a loss of 20% or less. Here, loss is defined as the fraction of the light that is not coupled into optical assembly 10.

In an example, optical assembly 10 has a thickness $TH10 \leq 0.8$ mm and preferably $0.2$ mm $\leq TH10 \leq 0.25$ mm. Such small values for the thickness TH10 of optical assembly 10 allows for a flat-screen device 300 (such as shown in FIG. 17 and introduced and discussed in greater detail below) to be very thin and to have a small form factor. Also, the small diameter of light-diffusing optical fiber 50 allows for very narrow bezels 143.

In an example, the coupling efficiency ϵ of scattered light 102S from light-diffusing optical fiber 50 into optical assembly 10 as internally reflected (guided) light is $\epsilon \geq 70\%$. The coupling efficiency is greater than the typical light coupling efficiencies of convention flat-panel display devices that utilize light conventional light sources, such as LEDs.

In another example illustrated in FIG. 15A (introduced and discussed in greater detail below), a light-absorbing feature 25U can be formed on upper surface 24U of upper sheet 20. Light-absorbing feature 25U can be used to absorb scattered light 102S in an embodiment where scattered light exits upper surface 24U. In this case, light-absorbing feature 25U serves to substantially absorb scattered light 102S so that an observer 400 sees a dark feature corresponding to the light-absorbing feature Light-absorbing feature 25U can be used, for example, to form indicia, text, signage, etc.

FIG. 14 is a top-down view of an example embodiment of system 6 wherein light-diffusing optical fiber 50 has a serpentine configuration in the X-Z plane. FIG. 15A is a cross-sectional view of the optical assembly 10 of FIG. 14 as taken along the line CS1. The example embodiment of system 6 of FIGS. 14 and 15A distributes light-diffusing optical fiber 50 so that it can provide scattered light 102S to a large area of upper sheet 20U. The increased length of the light-diffusing optical fiber 50 provided by the serpentine configuration of the light-diffusing optical fiber 50 along the upper sheet 20U may allow for a greater proportion of light emitted from the light source 100 into the light-diffusing optical fiber 50 to be emitted into the surrounding environment. As clearly depicted in FIG. 14, the length of the light-diffusing optical fiber 50 positioned along upper sheet 20U may be greater than the length of the perimeter 11 of the upper sheet 20U (see FIGS. 11 and 12A-G). It should be understood that a variety of configurations of the light-diffusing optical fiber 50 positioned along the upper sheet 20U having lengths greater than the perimeter 11 of the upper sheet 20U may be incorporated into the light-coupling optical system 6 without departing from the scope of the present disclosure.

FIG. 15B is similar to FIG. 15A and illustrates an example embodiment of the optical assembly 10 of FIG. 14 that includes a reflective lower sheet 20L as well as side reflectors 140. Reflective lower sheet 20L serves to reflect scattered light 102S back up to upper sheet 20U. Reflective lower sheet 20L may be specularly reflecting or diffusely reflecting. Note that some of scattered light 102S travels through upper sheet 20U while some of the scattered light may fall within the critical angle and be trapped within upper sheet and index-matching layer 12 via total internal reflection. Also, FIG. 15B illustrates at the left-most side of the Figure how scattered light 102S can re-scatter within index-matching layer 12 when the index-matching layer is configured to scatter light, e.g., by the inclusion of particulates.

FIG. 16A is a cross-sectional view similar to that of FIG. 12B and illustrates another example embodiment of optical assembly 10. Optical assembly 10 of FIG. 16A include a first low-index layer 510 (e.g., a low-index polymer) immediately adjacent upper surface 24U of upper sheet 20U and a second low-index layer 510 between index-matching layer 12 and lower sheet 20L. Index-matching layer 12 is configured to scatter scattered light 102S from light-diffusing optical fiber 50 to form twice-scattered light 102S'.

In an example, index-matching layer 12 comprises a doped polymer. In an example, index-matching layer 12 has a thickness $TH12 = 0.3$ mm thick while upper sheet 20U is made of glass and has a thickness of THU=0.7 mm thick. In an example embodiment, lower sheet 20L is configured as a diffuse reflector that diffusely reflects scattered light 102S. In an example, reflecting member 140 serves as a bezel to cover light-diffusing optical fiber 50 at periphery 11. In an example, the edge of light-diffusing optical fiber 50 closest to periphery 11 is about 2 mm away from the periphery.

FIG. 16B is similar to FIG. 16A and shows an example embodiment where light-diffusing optical fibers 50 are outside of and adjacent index-matching layer 12. Note that since the diameter of light-diffusing optical fiber 50 is relatively small (e.g., 250 microns), there is no need for a substantial bezel or any bezel.

With reference to FIGS. 16A and 16B, optical assembly 10 further includes a cover film 520. In an example, cover film 520 is configured as a so-called "brightness enhancement film" (BEF) that increases brightness for a viewer 400 that views the optical assembly at an angle relatively close to normal incidence. In an example, cover film 520 is configured to polarize light, which is needed for liquid crystal displays (LCDs). The optical assembly 10 of FIGS. 16A and 16B constitutes a back-lighting unit that can be used in flat-panel displays. FIG. 17 is a schematic diagram of a flat-screen device 300 that employs system 6 that includes optical assembly 10 as described above in connection with FIGS. 16A and 16B. Flat-screen device 300 includes a light-modulation display assembly 310 operably arranged with optical assembly 10.

With reference to FIG. 18A, in an example embodiment, light source 150 is part of a light source assembly 149 and is configured with red (R), green (G) and blue (B) light emitters 151, i.e., 151R, 151G and 151B, respectively, such as laser diodes. Light emitters 151R, 151G and 151B are optically connected to respective ports of a multiplexing device 167 via respective optical fiber sections FR, FG and FB, which in an example are low-loss optical fibers rather than light-diffusing optical fibers. Light emitters 151R, 151G and 151B respectively emit light 152R, 152G and 152B. While discussion above in regard to the light emitters 151 is in reference to red, green, and blue light emitters 151R, 151G, 151B, it should be understood that a plurality of light emitters including but not limited to a first, a second, and a third light emitter, that emit light at various wavelengths may be incorporated into the optical assemblies 10 disclosed herein to provide light having the desired color temperature and intensity.

Light-diffusing optical fiber 50 is also connected to multiplexing device. In an example, light source 150 includes control electronics 153 configured to control the operation of light source 150, including the sequential activation of light emitters 151R, 151G and 151B. In another example, control electronics 153 are separate from but operably connected to light source 150.

Light source 150 is configured via control electronics 153 to time-multiplex the light emitters 151R, 151G and 151B to generate red light 152R, green light 152G and blue light 152B, respectively. This light travels over the respective optical fiber sections FR, FG and FB and to multiplexing device 167, which multiplexes the light onto light-diffusing optical fiber 50, which as described above resides within or adjacent index-matching layer 12.

This arrangement for light source assembly 149 can be used to generate field-sequential color in optical assembly 10 as part of flat-screen device 300. It is noted that such a configuration obviates the need for a color filters used with white-light LEDs, and also allows for the use of lasers rather than LEDs as the light emitters 151. This results in an improved color gamut as compared to conventional LCD flat-screen devices. In an example, the color gamut improves by up to a factor of about 1.9. It also allows for improved energy efficiency, e.g., up to about a 3× improvement (i.e., an energy reduction of about 3×).

FIG. 18B is similar to FIG. 18A, but illustrates an example where light source assembly 149 includes three light-diffusing optical fibers 50R, 50G and 50B respectively optically connected directly to respectively light emitters 151R, 151G and 151B. Portions of the three light-diffusing optical fibers 50 reside within or adjacent index-matching layer 12 as described above in connection with the various embodiments described by way of example as using a single index-matching optical fiber. This configuration can also be used to form field-sequential color in flat-panel display 300.

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present disclosure without departing from the spirit and scope of the same. Thus, it is intended that the present disclosure cover the modifications and variations of this disclosure provided they come within the scope of the appended claims and their equivalents.

We claim:

1. A light-coupling optical system, comprising:
a transparent sheet having a perimeter;
at least one light-diffusing optical fiber having a glass core, a cladding surrounding the glass core, a light-scattering layer surrounding the cladding, and a length, the glass core having randomly arranged voids configured to provide substantially spatially continuous light emission from the glass core and out of the cladding, through the a light-scattering layer and into the transparent sheet along at least a portion of the length, the at least one light-diffusing optical fiber being coupled to at least a portion of the perimeter of the transparent sheet;
at least one light source optically coupled to the at least one light-diffusing optical fiber, the at least one light-diffusing optical fiber scattering light optically coupled into the at least one light-diffusing optical fiber from the at least one light source; and
a bezel surrounding the at least one light-diffusing optical fiber and the perimeter of the transparent sheet.

2. The light-coupling optical system of claim 1, wherein the bezel comprises a reflecting surface.

3. The light-coupling optical system of claim 2, wherein the reflecting surface is disposed adjacent to at least a portion of the perimeter and diffusely or specularly reflecting the scattered light into the transparent sheet.

4. The light-coupling optical system of claim 1, wherein the transparent sheet includes an upper surface that includes at least one light-scattering feature.

5. The light-coupling optical system of claim 1, further comprising an index-matching layer disposed in contact with a lower surface of the transparent sheet, the index-matching layer having a second refractive index substantially the same as a first refractive index of the transparent sheet.

6. The light-coupling optical system of claim 1, wherein the light source comprises a red light emitter, a green light emitter, and a blue light emitter, with each of the light emitters being optically coupled to the at least one light-diffusing optical fiber.

7. The light-coupling optical system of claim 6, further comprising control electronics operably connected to the light source or included therein and configured to control the sequential activation of the red, green and blue light emitters to emit red, green, and blue light, respectively, which red, green and blue light is sequentially transmitted down the at least one light-diffusing optical fiber to form sequentially emitted red, green, and blue scattered light.

8. The light-coupling optical system of claim 6, wherein the at least one light-diffusing optical fiber comprises at least three light-diffusing optical fibers, each of the at least three light-diffusing optical fibers optically coupled directly to one of the red light emitter, the green light emitter, and the blue light emitter.

9. The light-coupling optical system of claim 1, wherein the light source comprises a first emitter emitting light at a first wavelength and a second emitter emitting light at a second wavelength different than the first wavelength, each of the first emitter and the second emitter being optically coupled to the at least one light-diffusing optical fiber.

10. The light-coupling optical system of claim 9, wherein the first emitter and the second emitter are coupled to respective ports of a multiplexing device that couples the first emitter and the second emitter to the at least one light-diffusing optical fiber.

11. A light-coupling optical system, comprising:
a transparent sheet having a perimeter;
at least one light-diffusing optical fiber having a glass core, a cladding surrounding the glass core, and a length, the glass core having randomly arranged voids configured to provide substantially spatially continuous light emission from the glass core and out of the cladding, and into the transparent sheet along at least a portion of the length, the at least one light-diffusing optical fiber being coupled to at least a portion of the perimeter of the transparent sheet;
at least one light source optically coupled to the at least one light-diffusing optical fiber, the at least one light-diffusing optical fiber scattering light optically coupled into the at least one light-diffusing optical fiber from the at least one light source; and
a bezel surrounding the at least one light-diffusing optical fiber and the perimeter of the transparent sheet,
wherein the at least one light-diffusing optical fiber further comprises a coating layer surrounding the cladding and a light-scattering layer surrounding the coating layer.

12. A light-coupling optical system, comprising:
a transparent sheet having a perimeter and substantially parallel opposite upper and lower surfaces;
at least one light-diffusing optical fiber having a glass core, a cladding surrounding the glass core, a light-scattering layer surrounding the cladding, and a length, the glass core having randomly arranged voids configured to provide substantially spatially continuous light emission from the glass core and out of the cladding through the a light-scattering layer and into the transparent sheet along at least a portion of the length, the at least one light-diffusing optical fiber being positioned proximate to at least one of the upper surface or the lower surface of the transparent sheet; and
at least one light source optically coupled to the at least one light-diffusing optical fiber, the at least one light-diffusing optical fiber scattering light optically coupled into the at least one light-diffusing optical fiber from the at least one light source,
wherein a length of the at least one light-diffusing optical fiber positioned inside of the perimeter of the transparent sheet is greater than a length of the perimeter.

13. The light-coupling optical system of claim 12, wherein the at least one light-diffusing optical fiber includes a looped portion.

14. The light-coupling optical system of claim 12, wherein the at least one light-diffusing optical fiber includes a serpentine portion.

15. The light-coupling optical system of claim 12, wherein the transparent sheet includes an upper surface that includes at least one light-scattering feature.

16. The light-coupling optical system of claim 12, further comprising an index-matching layer in contact with a lower surface of the transparent sheet, the index-matching layer having a second refractive index substantially the same as a first refractive index of the transparent sheet.

17. The light-coupling optical system of claim 12, wherein the light source comprises a first emitter emitting light at a first wavelength and a second emitter emitting light at a second wavelength different than the first wavelength, each of the first emitter and the second emitter being optically coupled to the at least one light-diffusing optical fiber.

18. The light-coupling optical system of claim 17, wherein the first emitter and the second emitter are coupled to respective ports of a multiplexing device that couples the first emitter and the second emitter to the at least one light-diffusing optical fiber.

19. The light-coupling optical system of claim 12, further comprising a lower sheet positioned opposite the at least one light-diffusing optical fiber from the transparent sheet.

20. The light-coupling optical system of claim 19, wherein the lower sheet comprises a reflective surface that reflects light scattered from the light-diffusing optical fiber through the transparent sheet.

21. A light-coupling optical system, comprising:
a transparent sheet having a perimeter and substantially parallel opposite upper and lower surfaces;
at least one light-diffusing optical fiber having a glass core, a cladding surrounding the glass core, and a length, the glass core having randomly arranged voids configured to provide substantially spatially continuous light emission from the glass core and out of the cladding and into the transparent sheet along at least a portion of the length, the at least one light-diffusing optical fiber being positioned proximate to at least one of the upper surface or the lower surface of the transparent sheet; and
at least one light source optically coupled to the at least one light-diffusing optical fiber, the at least one light-diffusing optical fiber scattering light optically coupled into the at least one light-diffusing optical fiber from the at least one light source,
wherein a length of the at least one light-diffusing optical fiber positioned inside of the perimeter of the transparent sheet is greater than a length of the perimeter,
wherein the at least one light-diffusing optical fiber comprises a central core region, cladding surrounding the central core region, a coating layer surrounding the cladding, and a light-scattering layer surrounding the coating layer.

22. A light-coupling optical system, comprising:
a transparent sheet having a perimeter;
at least one light-diffusing optical fiber having a glass core, a cladding surrounding the glass core, a light-scattering layer surrounding the cladding, and a length, the glass core having randomly arranged voids configured to provide substantially spatially continuous light emission from the glass core and out of the cladding through the a light-scattering layer into the transparent sheet along at least a portion of the length;
a lower sheet having a reflective surface, the lower sheet positioned opposite the at least one light-diffusing optical fiber from the transparent sheet; and
at least one light source optically coupled to the at least one light-diffusing optical fiber, the at least one light-diffusing optical fiber scattering light optically coupled into the at least one light-diffusing optical fiber from the at least one light source.

23. The light-coupling optical system of claim 22, wherein a length of the at least one light-diffusing optical fiber positioned inside of the perimeter of the transparent sheet is greater than a length of the perimeter.

24. The light-coupling optical system of claim 22, wherein the at least one light-diffusing optical fiber includes a serpentine portion.

25. The light-coupling optical system of claim 22, wherein the transparent sheet includes an upper surface that includes at least one tight-scattering feature.

26. The light-coupling optical system of claim 22, further comprising an index-matching layer in contact with a lower surface of the transparent sheet, the index-matching layer having a second refractive index substantially the same as a first refractive index of the transparent sheet.

27. The light-coupling optical system of claim 22, wherein the light source comprises a first emitter emitting light at a first wavelength and a second emitter emitting light at a second wavelength different than the first wavelength, each of the first emitter and the second emitter being optically coupled to the at least one light-diffusing optical fiber.

28. The light-coupling optical system of claim 27, wherein the first emitter and the second emitter are coupled to respective ports of a multiplexing device that couples the first emitter and the second emitter to the at least one light-diffusing optical fiber.

29. A light-coupling optical system, comprising:
a transparent sheet having a perimeter;
at least one light-diffusing optical fiber having a glass core, a cladding surrounding the glass core, and a length, the glass core having randomly arranged voids configured to provide substantially spatially continuous light emission from the glass core and out of the cladding and into the transparent sheet along at least a portion of the length;
a lower sheet having a reflective surface, the lower sheet positioned opposite the at least one light-diffusing optical fiber from the transparent sheet; and
at least one light source optically coupled to the at least one light-diffusing optical fiber, the at least one light-diffusing optical fiber scattering light optically coupled into the at least one light-diffusing optical fiber from the at least one light source,
wherein the at least one light-diffusing optical fiber comprises a central core region, cladding surrounding the central core region, a coating layer surrounding the cladding, and a light-scattering layer surrounding the coating layer.

30. A light-coupling optical system, comprising:
a transparent sheet having a perimeter and substantially parallel opposite upper and lower surfaces; and
at least one light-diffusing optical fiber having a glass core, a cladding surrounding the glass core, a light-scattering layer surrounding the cladding, and a length, the glass core having randomly arranged voids configured to provide substantially spatially continuous light emission from the glass core and out of the cladding through the a light-scattering layer into the transparent sheet along at least a portion of the length, the at least one light-diffusing optical fiber being positioned proximate to at least one of the upper surface or the lower surface of the transparent sheet; and
wherein a length of the at least one light-diffusing optical fiber positioned inside of the perimeter of the transparent sheet is greater than a length of the perimeter.

31. The light-coupling optical system of claim 30, wherein the at least one light-diffusing optical fiber includes a serpentine portion.

32. The light-coupling optical system of claim 30, wherein the transparent sheet includes an upper surface that includes at least one light-scattering feature.

33. The light-coupling optical system of claim 30, further comprising an index-matching layer in contact with a lower surface of the transparent sheet, the index-matching layer having a second refractive index substantially the same as a first refractive index of the transparent sheet.

34. A light-coupling optical system, comprising:
a transparent sheet having a perimeter and substantially parallel opposite upper and lower surfaces; and
at least one light-diffusing optical fiber having a glass core, a cladding surrounding the glass core, and a length, the glass core having randomly arranged voids configured to provide substantially spatially continuous light emission from the glass core and out of the cladding and into the transparent sheet along at least a portion of the length, the at least one light-diffusing optical fiber being positioned proximate to at least one of the upper surface or the lower surface of the transparent sheet; and
wherein a length of the at least one light-diffusing optical fiber positioned inside of the perimeter of the transparent sheet is greater than a length of the perimeter
wherein the at least one light-diffusing optical fiber comprises a central core region, cladding surrounding the central core region, a coating layer surrounding the cladding, and a light-scattering layer surrounding the coating layer.

35. The light-coupling optical system of claim 30, further comprising a lower sheet positioned opposite the at least one light-diffusing optical fiber from the transparent sheet.

36. The light-coupling optical system of claim 35, wherein the lower sheet comprises a reflective surface that reflects light scattered from the light-diffusing optical fiber through the transparent sheet.

37. A light-coupling optical system, comprising:
a transparent sheet having a perimeter and substantially parallel opposite upper and lower surfaces; and
at least one light-diffusing optical fiber having a glass core, a cladding surrounding the glass core, and a length, the glass core having randomly arranged voids configured to provide substantially spatially continuous light emission from the glass core and out of the cladding and into the transparent sheet along at least a portion of the length, the at least one light-diffusing optical fiber being positioned proximate to at least one of the upper surface or the lower surface of the transparent sheet; and
wherein a length of the at least one light-diffusing optical fiber positioned inside of the perimeter of the transparent sheet is greater than a length of the perimeter wherein the at least one light-diffusing optical fiber comprises a central core region, cladding surrounding the central core region, and a light-scattering layer surrounding the cladding.

38. The light-coupling optical system of claim 37, further comprising a lower sheet positioned opposite the at least one light-diffusing optical fiber from the transparent sheet.

39. The light-coupling optical system of claim 38, wherein the lower sheet comprises a reflective surface that reflects light scattered from the light-diffusing optical fiber through the transparent sheet.

\* \* \* \* \*